US012579078B2

(12) United States Patent
LeMay et al.

(10) Patent No.: US 12,579,078 B2
(45) Date of Patent: Mar. 17, 2026

(54) SPECULATING OBJECT-GRANULAR KEY IDENTIFIERS FOR MEMORY SAFETY

(71) Applicant: Intel Corporation, Santa Clara, CA (US)

(72) Inventors: Michael LeMay, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 17/886,981

(22) Filed: Aug. 12, 2022

(65) Prior Publication Data

US 2024/0054080 A1 Feb. 15, 2024

(51) Int. Cl.
*G06F 12/14* (2006.01)

(52) U.S. Cl.
CPC ...... *G06F 12/1458* (2013.01); *G06F 12/1408* (2013.01); *G06F 12/1433* (2013.01)

(58) Field of Classification Search
CPC ................. G06F 12/14; G06F 12/1458; G06F 12/1408; G06F 12/1433
See application file for complete search history.

(56) References Cited

U.S. PATENT DOCUMENTS

| | | | |
|---|---|---|---|
| 9,858,140 B2 | 1/2018 | Gabor et al. | |
| 10,162,694 B2 | 12/2018 | Stark et al. | |
| 11,620,391 B2 | 4/2023 | Lemay et al. | |
| 11,782,826 B2 | 10/2023 | Durham et al. | |
| 2016/0371139 A1 | 12/2016 | Stark et al. | |
| 2016/0371179 A1 | 12/2016 | Stark et al. | |
| 2018/0095899 A1* | 4/2018 | Durham | G06F 12/1408 |
| 2019/0042799 A1* | 2/2019 | Durham | G06F 21/64 |
| 2019/0166158 A1* | 5/2019 | Grocutt | H04L 63/1416 |
| 2020/0409868 A1 | 12/2020 | Durham | |
| 2022/0179947 A1* | 6/2022 | Ekberg | G06F 21/556 |
| 2022/0222186 A1 | 7/2022 | Durham et al. | |
| 2025/0217291 A1 | 7/2025 | Durham et al. | |

FOREIGN PATENT DOCUMENTS

| | | |
|---|---|---|
| EP | 3757803 A1 | 12/2020 |
| EP | 3716081 B1 | 4/2024 |

OTHER PUBLICATIONS

AMD, Secure Encrypted Virtualization API Version 0.24, Apr. 1, 2020, 55766, 1-122pp, 3.24.
ARM, Armv8.5-A Memory Tagging Extension, 2019.
Arm® Architecture Reference Manual, Armv8, for Armv8-A architecture profile, 2020, 1-13.
Hybrid Memory Safety Enforcement, 63309369.

* cited by examiner

*Primary Examiner* — Esther B. Henderson
(74) *Attorney, Agent, or Firm* — Nicholson De Vos Webster & Elliott LLP

(57) ABSTRACT

A processor core requests a cacheline to be loaded from a memory in a memory access request; and a cache determines a speculated color value for the memory access request, receives a data granule of the cacheline from the memory, and decrypts data of the data granule using the speculated color value.

19 Claims, 22 Drawing Sheets

700

ATTEMPT TO MOVE CACHLINE OUT OF ONE FIRST LEVEL CACHE TO A LOWER CACHE OR A DIFFERENT FIRST LEVEL CACHE

702

KEY ID CHECK SET

YES → 704 ALLOW MOVE IMMEDIATELY

NO

706

ANY ACC BITS SET?

NO →

YES

708

WAIT FOR METADATA TO ARRIVE AND FOR ANY MISMATCHES TO BE ASYNCHRONOUSLY REPORTED ON THE HW THREAD(S) FOR THE SOURCE FIRST LEVE CACHE

710

ALLOW MOVE

METADATA ARRIVES AT CACHELINE
CONTAINING DATA AND ACC INDICATORS ⟩ 900

902

SPECULATED KEY ID
MATCHES STORED KEY ID? → YES

NO

904

REPLACE MIS-SPECULATED KEY ID IN
CACHELINE WITH STORED KEY ID AND
RE-DECRYPT DATA GRANULE

906

ANY ACC BIT SET
FOR DATA GRANULE? → NO

YES

908

ANY MEMORY ACCESS
BLOCKED SYNCHRONOUSLY
WAITING FOR THE
METADATA? → NO

912

SET MSR BIT THAT
ASYNCHRONOUSLY
INDICATES MEMORY
SAFETY VIOLATION

YES

910

GENERATE EXCEPTION FOR
OLDEST MEMORY ACCESS
BLOCKED ON THE METADATA

914

SET KEY ID
CHECK

SPECULATING OBJECT-GRANULAR KEY IDENTIFIERS FOR MEMORY SAFETY

BACKGROUND

Memory safety, referring to the safety of the contents of computer memory in a computing system, is a high priority issue in the computer industry. It is estimated that 70% of software vulnerabilities are due to memory safety violations.

However, memory safety enforcement often imposes substantial overheads and code size increases due to metadata accesses and instrumentation, thus creating significant performance costs from memory safety measures.

BRIEF DESCRIPTION OF DRAWINGS

Various examples in accordance with the present disclosure will be described with reference to the drawings, in which:

FIG. 9 is a flow diagram illustrating processing for allowing metadata to be joined into a cacheline that already contains data in an example.

2

Figure 21:
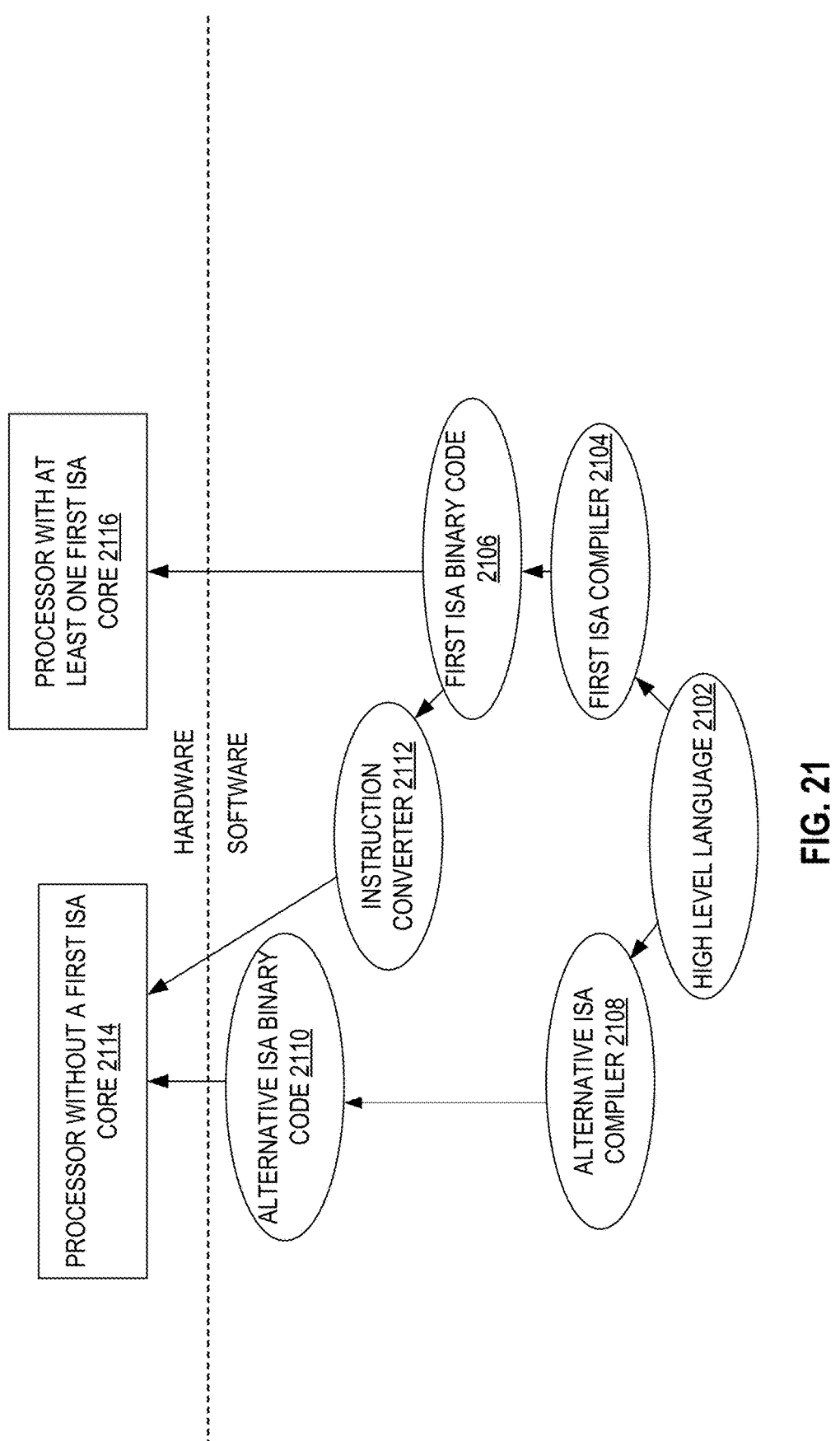

FIG. 21 is a block diagram illustrating the use of a software instruction converter to convert binary instructions in a source instruction set architecture to binary instructions in a target instruction set architecture according to examples.

DETAILED DESCRIPTION

The present disclosure relates to methods, apparatus, systems, and non-transitory machine-readable storage media for speculating object-granular key identifiers (IDs) for memory safety. As used herein, an object-granular key ID may also be called a color value, or simply a color.

Memory Safety (MS) measures are used to prevent vulnerabilities in computer memory. However, MS generally requires substantial overheads and code size increases due to metadata accesses and instrumentation. For example, the use of memory tagging enables comparison of a tag within a pointer with a tag associated with each granule of data (a granule of data being a data object of a certain size) to ensure there is a match before proceeding with access. However, this operation requires significant amounts of data storage to enable the memory tag operation, substantial code instrumentation to check the tags, and significant performance overhead due to loading the tags from memory.

Memory encryption features such as Multi-Key Total Memory Encryption (MK-TME) enable the use of multiple encryption keys for memory allocations. Address transformation features such as Linear Address Masking (LAM) modify checking that is applied to 64-bit linear or virtual addresses such that software may use a subset of address bits for metadata without those ignored bits being input to address translation. Memory encryption features and address transformation features may be utilized together in providing memory safety. Memory encryption features can be used to enforce MS without requiring costly metadata because it permits individual cachelines to be encrypted with separate keys as specified with a Key identifier (ID) (KID) in the physical memory address used to access a cacheline. Thus, by assigning different keys to different allocations (such as adjacent allocations) and rotating through a set of keys as memory is reused, both spatial and temporal safety can be enforced, e.g., to address both buffer overflows and use-after-free (in which an attempt is made to access memory after it has been freed) vulnerabilities. This enforces cryptographic isolation even with an only-encryption operation (without integrity check), and memory encryption features with added memory integrity protection further enables detecting memory safety violations because the integrity check will trigger if the wrong key is used for a particular cacheline. To enable integrity, a Message Authentication Code (MAC) may be stored within memory to verify the correct (same) data encryption key was used to decrypt the data. These MACs may be stored per cacheline using available Error Correction Code (ECC) memory devices or stored in a sequestered location in a memory.

In one known approach for enforcing memory safety, memory tagging associates 4-bit color values loaded from sequestered memory into cachelines alongside the cacheline data. Those values are matched against colors embedded in pointers. Managing the in-memory metadata may impose high performance overhead, in addition to overheads for tag checking.

An alternative is to cryptographically bind data to color values so that using a pointer with an incorrect color results in garbling the data access. This can be accomplished by treating color values as key IDs and providing object-granular key ID distinctions rather than operating just at cacheline granularity, as is the case for memory encryption. However, purely relying on color information in the pointer does not provide direct detection support in which an access by a pointer with an incorrect color immediately generates an exception.

The technology described herein resolves these tradeoffs by checking colors in pointers against colors stored in memory to allow generating exceptions on mismatches, but the technology allows some limited uses of the decrypted data to proceed prior to colors being loaded from memory by relying on cryptographic isolation of data. This reduces performance overheads. This approach can also be used without data encryption to allow speculative tag checks, although that does not protect data from garbling during accesses that are mis-speculated as passing tag checks.

The naïve approach is for the memory controller to wait for color values to be loaded from a metadata table in memory prior to placing data into the cache so that the data is inseparable from the associated color values. However, waiting for color values to be loaded prior to placing data into the cache imposes substantial slowdowns, especially when usages are facing tight memory bandwidth constraints. Tag checking overheads are on top of that.

An alternative approach is to not rely on color values stored in a metadata table, but rather to rely solely on cryptographic isolation. Relying solely on cryptographic isolation mitigates software memory safety vulnerabilities, but it does not provide immediate detection of memory safety violations. Some implementations may also check integrity, which does provide immediate detection, but the integrity check values themselves are a form of metadata that imposes substantial overheads when these values are consulted as cachelines are loaded by the memory controller.

In the present technology described herein, data can be loaded into the cache, sent to a processor core, and consumed, all without being delayed waiting for associated color values to be loaded from memory. Data is optionally encrypted with a binding between the encryption of each granule and the associated color for that granule such that a memory safety violation based on an access with an incorrect color value results in garbled data.

Efficiently enforcing memory safety both during architectural execution and transient execution is a high priority for many customers of computing systems. Alternative architectures support color value checks via memory tagging, but the technology described herein provides the opportunity to develop a more performant approach with deeper hardening against physical attacks, untrusted system on a chip (SoC) intellectual property (IP), side channels, and untrusted tenants on shared platforms by relying on cryptography to protect data in use in a way that is bound to color values.

Figure 1:
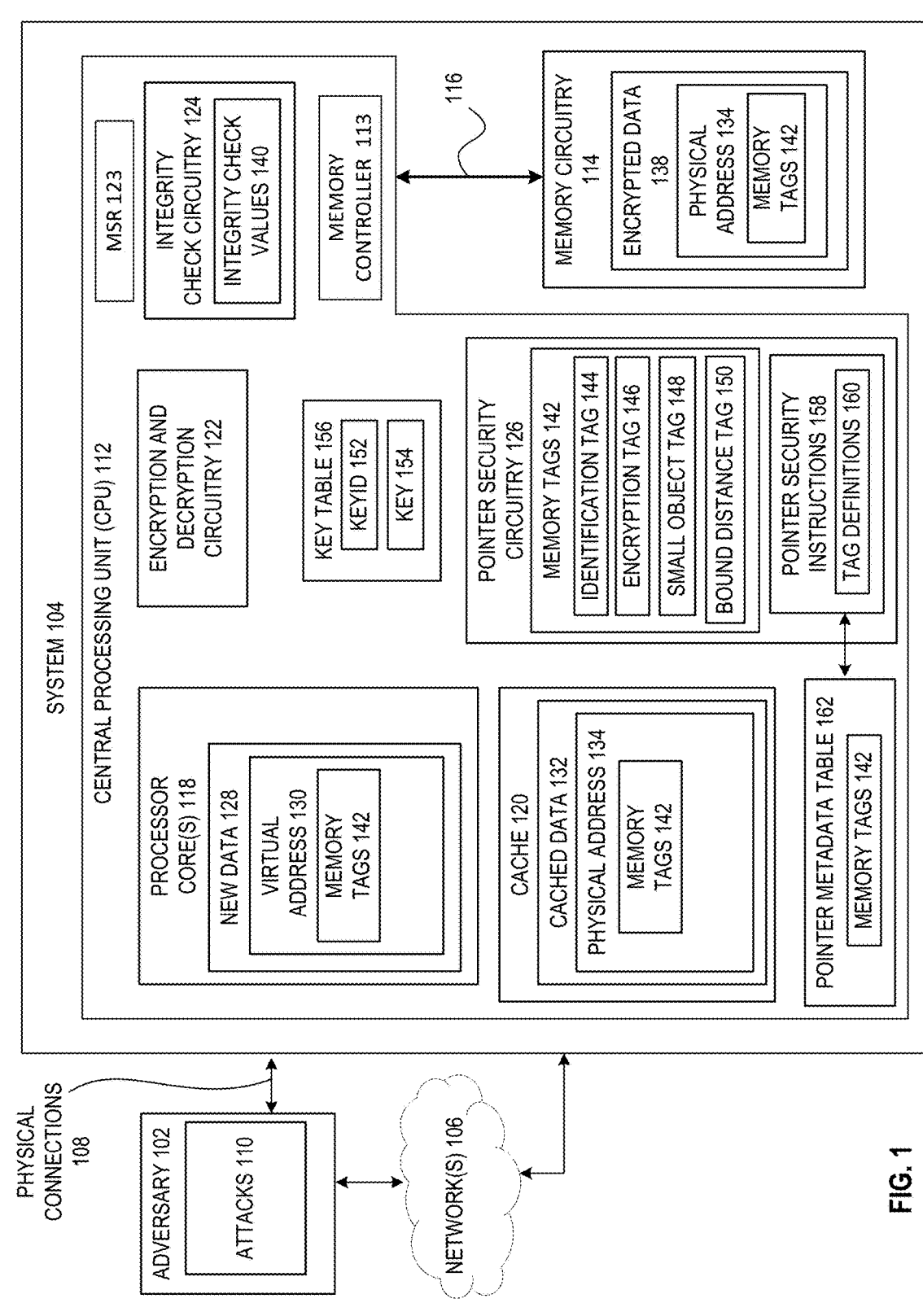
FIG. 1 is a block diagram of a computing environment providing memory safety within a central processing unit (CPU) by speculating object-granular key IDs according to an example.

FIG. 1 is a block diagram of a computing environment 100 that reduces the likelihood of successful side-channel attacks within a central processing unit (CPU) by providing address-based security features for memory within the CPU, according to one example. The computing environment 100 reduces the likelihood of successful side-channel attacks and memory exploits, while concurrently enabling the CPU to perform and benefit from performing speculative operations, according to an embodiment. The computing environment 100 includes an adversary 102 coupled to a system 104 through one or more networks 106 or one or more physical connections 108, according to an embodiment. The adversary 102 may perform one or more memory exploits or side-channel attacks 110 on the system 104 through the networks 106 and/or through the physical connections 108.

The system 104 may include one or more of a variety of computing devices, including, but not limited, to a personal computer, a server, a laptop, a tablet, a smartphone, a motherboard with a chipset, or some other computing device, according to various embodiments. The system 104 is configured to protect a CPU against side-channel attacks using a variety of address-based security features that enable the CPU to safely operate while performing speculative operations.

The adversary 102 may be a computing system, a person, or a combination of the computing system and a person, which may attempt one or more memory exploits or side-channel attacks on and against the system 104. The adversary 102 may use one or more networks 106 to execute the exploits and side-channel attacks 110. The adversary 102 may also use one or more physical connections 108, such as a memory interposer, memory probes, or the like, to read, modify, and/or write to one or more memory addresses within the system 104 in order to physically attack the system. Some of the attacks 110 may include attempting to override a pointer, attempting to manipulate a pointer (e.g., add a value to a pointer to cause the pointer to point to an unintended object or move beyond the object's bounds), use a freed pointer to access a new object, and the like.

The system 104 is configured to provide a variety of memory-based security features to protect against the attacks 110, according to an embodiment. The system 104 includes at least one central processing unit (CPU) 112 which is coupled to memory circuitry 114 through one or more communications channels 116, according to an embodiment. The CPU 112 includes one or more processor cores 118, memory controller 113, cache 120, encryption and decryption circuitry 122, and integrity check circuitry 124, according to an embodiment. Memory circuitry 114 may be managed by memory controller 113 on CPU 112. The CPU 112 also includes pointer security circuitry 126 that is configured to expand memory tag capabilities, reduce or prevent pointer override attacks, reduce or prevent pointer manipulation, prevent the reuse of freed pointers and enable byte-granularity memory safety for the CPU 112, according to an embodiment. In various implementations, pointer security circuitry 126 may be included in cache 120, processor core(s) 118, or within other circuitry in CPU 112.

The CPU 112 may include any number and/or combination of currently available and/or future developed single- or multi-core central processing units. In embodiments, the CPU 112 may include a general-purpose processor, such as a Core® i3, i5, i7, 2 Duo and Quad, Xeon®, Itanium®, Atom®, or Quark® microprocessor, available from Intel® (Intel Corporation, Santa Clara, CA). Alternatively, the CPU 112 may include one or more processors from another manufacturer or supplier, such as Advanced Micro Devices (AMD®, Inc.), ARM Holdings® Ltd, MIPS®, etc. The CPU 112 may include a special-purpose processor, such as, for example, a network or communication processor, compression engine, graphics processor, co-processor, embedded processor, or the like. The CPU 112 may be implemented as a single semiconductor package or as a combination of stacked or otherwise interconnected semiconductor packages and/or dies. The CPU 112 may be a part of and/or may be implemented on one or more substrates using any of a number of process technologies, such as, for example, BiCMOS, complementary metal-oxide semiconductor (CMOS), Bipolar CMOS (BiCMOS), or n-type metal-oxide semiconductor (NMOS).

The memory circuitry 114 represents one or more of a variety of types of memory that may be used in the system 104 and managed by memory controller 113, according to an embodiment. The memory circuitry 114 may be volatile memory, may be non-volatile memory, or may be a combination of volatile memory and non-volatile memory, according to an embodiment. The volatile memory may include various types of random-access memory (RAM). The non-volatile memory may include NAND memory, 3D crosspoint (3DXP), phase-change memory (PCM), hard disk drives, and the like, according to an embodiment.

The CPU 112 uses a number of components to move data back and forth between the CPU 112 and the memory circuitry 114, according to an embodiment. For example, while operating one or more software programs or while executing various instructions, processor core 118 may generate new data 128. Processor core 118 may use a virtual address (a.k.a. Linear Address or Logical Address) 130 the new data 128 to write the new data 128 to the cache 120 or to the memory circuitry 114 via a translated physical address 134. The new data 128 may be saved in the cache 120 as cache data 132, or may be added to existing cached data 132, according to an embodiment. The cached data 132 may have a physical address 134 including Key IDs, tags (or additional meta-data) 142. The CPU 112 may be configured to use the encryption and decryption circuitry 122 to encrypt the new data 128 and/or the cached data 132 prior to saving the new data 128 and/or the cached data 132 to the memory circuitry 114, as encrypted data 138. The CPU 112 may also use the integrity check circuitry 124 to generate integrity check values (or Message Authentication Codes/MAC) 140 that are based on the new data 128, the translated virtual address 130, the tags 142 for selecting the cryptographic MAC Key 154, and/or the physical address 134, according to an embodiment. The CPU 112 writes the integrity check values 140 to the memory circuitry 114, to enable corruption detection for the encrypted data 138 (caused, for example, by decrypting the data with using the wrong key).

In an embodiment, encryption and decryption circuitry 122 may be included in cache 120.

Although in FIG. 1 cache 120 is represented as a single block, it should be understood that cache 120 comprises one or more levels of a cache hierarchy, such as a level one cache (L1), a level two cache (L2), and a last level cache (LLC), and so on.

The CPU 112 may use pointer security circuitry 126 to provide security for the data within the system 104. Pointer security circuitry 126 enforces correct data access via pointers. The pointer security circuitry 126 may be configured to detect when the virtual address 130 and/or the corresponding translated physical address 134 is being overridden, detect when the virtual address 130 and/or the physical address 134 has been manipulated, detect when the virtual address 130 and/or the physical address 134 has been used after being freed, provide byte-granularity memory safety through bounds checking, provide definitions for use of memory tags, according to various embodiments disclosed herein.

When processor core 118 assigns (e.g., by executing a software program) the virtual address 130 to the new data 128, the pointer security instructions 158 may define, insert, or identify one or more memory tags 142 in the virtual address 130, to associate with the new data 128 to reduce the likelihood of a successful attack. The one or more memory tags 142 may include an identification tag 144, an encryption tag 146, a small object tag (or indicator) 148, and/or a bound distance tag 150.

The virtual address 130 for the new data 128 may include the identification tag 144 to provide security for the new data 128. The identification tag 144 may be colloquially referred to as a color, a color value, a cryptographic color, a memory color, a tag color, and the like. The identification tag 144 may include one or more bits of the virtual address 130. The pointer security circuitry 126 may be configured to define where within the virtual address 130 the identification tag 144 resides or is defined. For example, the pointer security circuitry 126 may define the identification tag 144 as the 8 most significant bits in the virtual address 130. The identification tag 144 may be defined as, for example, bits 56-62 (i.e., 7 bits) of bits 0-63 of the virtual address 130, assuming, as an example, that the length of the virtual address 130 is 64 bits.

The pointer security circuitry 126 may use the identification tag 144 in a variety of ways to provide security to the new data 128. For example, the pointer security circuitry 126 may use the identification tag 144 as a tweak or as part of a tweak in encryption and decryption circuitry 122. In one embodiment, the identification tag 144 is combined with a subset of the virtual address 130 translated to the physical address 134 to define a tweak that may be used by encryption and decryption circuitry 122 when encrypting the new data 128, according to an embodiment. Alternatively, the identification tag 144 (e.g., color) may be used as a key identifier (Key ID) 152 used to select the cryptographic key 154 used for encryption and/or integrity.

The physical address 134 for the new data 128 may include the encryption tag 146 to provide security for the new data 128. The encryption tag 146 may include one or more bits of the physical address 134. The pointer security circuitry 126 may be configured to define where within the physical address 134 the encryption tag 146 resides or is defined. For example, the pointer security circuitry 126 may define the encryption tag 146 as the 4 most significant bits in the physical address 134. The encryption tag 146 may be defined as, for example, bits 60-63 (i.e., 4 bits) of bits 0-63 of the physical address 134, assuming, as an example, that the length of the physical address 134 is 64 bits. The physical address may also be smaller than the virtual address, such as 56 bits in size. The encryption tag 146 may be a representation of a key ID 152 that is used to look up the encryption key 154 within a key table 156, by the encryption circuitry 122, according to an embodiment. The encryption tag 146 may also or alternatively be identified using other techniques, e.g., may be defined within one or more bits in the physical address 134. The encryption tag may be assigned by the processor based on which virtual machine (VM) is executing on a core or thread in a multitenant system or may be determined by the translation of a virtual address into a physical address via the page tables or extended page tables (EPTs) utilized by a memory management unit to populate virtual to physical address translations via translation lookaside buffers (TLB).

The virtual address 130 for the new data 128 may include the small object tag (or small object indicator bit) 148 to provide security for the new data 128. The small object tag 148 may include one or more bits of the virtual address 130. The pointer security circuitry 126 may be configured to define where within the virtual address 130 the small object tag 148 resides or is defined. For example, the pointer security circuitry 126 may define the small object tag 148 as the most significant bit in the virtual address 130. In one example, the pointer security circuitry 126 may use the small object tag 148 to provide byte-level pairings of memory tags of sub-cacheline objects stored within the same cacheline. For example, if the small object tag 148 is set (e.g., to "1"), the pointer security circuitry 126 may be configured to associate a number of identification tags within a single cacheline so that each of a number of subsets of data objects within that cacheline are assigned their own "color tag" or identification tag, according to an embodiment.

The virtual address 130 for the new data 128 may include the bound distance tag 150 to provide bounds security for the new data 128. The bound distance tag 150 and its associated features may be used as an alternative to the small object tag 148. The bound distance tag 150 may include one or more bits of the virtual address 130. The pointer security circuitry 126 may be configured to define where within the virtual address 130 the bound distance tag 150 resides or is defined. For example, the pointer security circuitry 126 may define the bound distance tag 150 as bits 51-57 of bits 0-63 of the virtual address 130. In one embodiment, the bound distance tag 150 includes bits 51-57 of bits 0-63 of the virtual address 130, and the identification tag 144 (the color) includes bits 58-63 (most significant 6 bits) of the virtual address 130, as an example.

The pointer security circuitry 126 may use the bound distance tag 150 to indicate how far outside of an object a memory address (i.e., a pointer) has strayed. The bound distance tag 150 may represent a signed number that represents a pointer that is either above or below the bounds of an original object that the memory address identified. The pointer security circuitry 126 may use the bound distance tag 150 to detect when the adversary 102 has modified a memory address (of a pointer) to redirect the memory address into a different object having the same identification tag as the object to which the memory address is authorized to point.

The pointer security circuitry 126 may also include pointer security instructions 158 that at least partially provide tag definitions 160. The pointer security instructions 158 may include a number of instructions or operations that may be used by the pointer security circuitry 126 or the CPU 112 to add a pointer in accordance with the tag definitions 160. The tag definitions 160 may define one or more of the length, location, and use of one or more of the identification tag 144, the encryption tag 146, the small object tag 148, and/or the bound distance tag 150.

The pointer security circuitry 126 may use a pointer metadata table 162 to store, update, and retrieve the memory tags 142 and/or the tag definitions 160, according to one embodiment. The pointer metadata table 162 may be used as an alternative to small object meta data that is stored on the same cacheline as its associated data, so that the small object meta data may be processed at the same time as the data and thus avoid speculation-based attacks. A separate table requires additional memory lookup operations which may either expose the solution to side-channel attack or reduce system performance as both memory lookups need to complete (both the metadata table lookup and the data lookup). In an embodiment, pointer metadata table 162 is a part of a processor core 118. In another embodiment, pointer metadata table 162 is stored in memory circuitry 114.

When the CPU 112 writes the data 132 for the physical address 134 location, the pointer security circuitry 126 may define, insert, or identify one or more memory tags 142 in the physical address 134, to associate with the cached data 132 to reduce the likelihood of a successful side-channel attack. The one or more memory tags 142 embedded within the physical address 134 may include one or more of the identification tag 144, the encryption tag 146, the small object tag 148, and/or the bound distance tag 150. The physical address 134 may include fewer, more, translated or different ones of the memory tags 142 than are used or associated with the virtual address 130, according to an embodiment.

As described herein above, the pointer security circuitry 126 may be configured to use the one or more memory tags 142 from the virtual address of the new data 128, from the cached data 132 and physical address, and from the encrypted data 138 to mitigate data corruption, memory address corruption, address manipulation, use after free, or otherwise unauthorized changes to address pointers within the CPU 112.

Various forms of memory tagging have been implemented in existing technology. In general memory tagging provides a tag within a pointer and a tag that is associated with each granule of memory to be accessed. The tags then can be compared to determine whether a memory access should be allowed.

Figure 2:
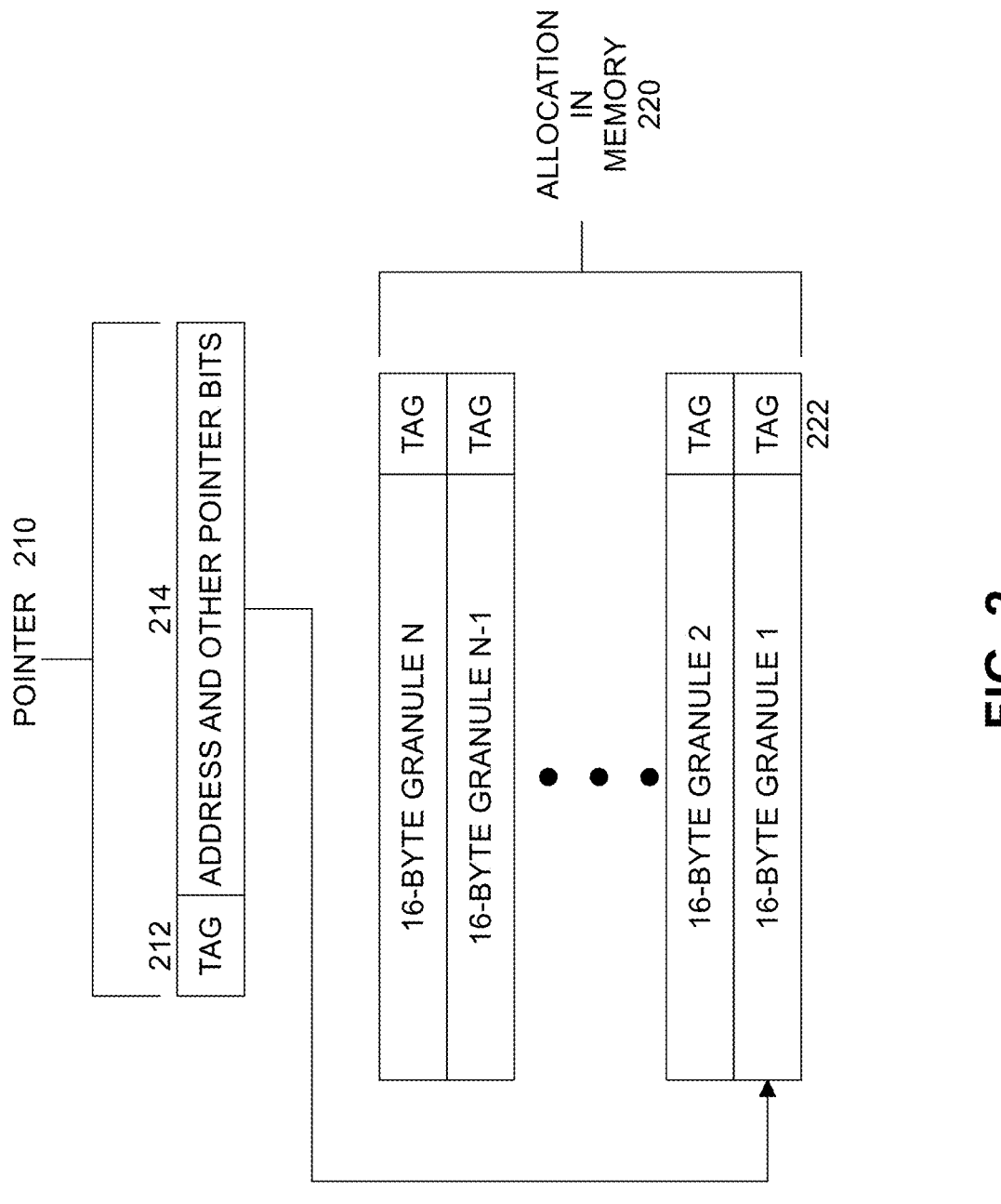
FIG. 2 illustrates memory tagging for memory safety enforcement according to an example.

As illustrated in FIG. 2, a pointer 210 includes a virtual address and other pointer bits 214, as well as a tag 212. The pointer 210 will point to one of a number of memory elements with an allocation in memory 220. The memory elements are referred to as granules, with, for example, each granule of memory including 16 bytes. In an embodiment, memory granules are stored in memory circuitry 114. As shown in FIG. 2, the allocation in memory includes a certain number n (where n can be any positive integer) 16-byte granules. Further, each granule includes a tag that can be matched against the tag of an associated pointer. For example, pointer 210 points to Granule 1 including memory tag 222, thus resulting in a comparison between pointer tag 212 and memory tag 222 prior to allowing memory access.

If there is a mismatch between pointer tag 212 and the memory tag 222, a processor (e.g., CPU 112) will generate an exception. Some memory tagging implementations are based on software instrumentation to load and check tags using ordinary arithmetic instructions. Other memory tagging implementations are based on dedicated hardware support.

Thus, memory tagging relies on comparing a tag value in a pointer against a tag value (e.g., memory tags 142) stored alongside any memory that may be accessed in a particular memory reference. If there is a mismatch in any of those comparisons, an exception may be generated synchronously, or an asynchronous indication of the violation may be set (e.g., in a Model-Specific Register (MSR) of CPU 112).

The tag value can be visualized as a "color" of a pointer or memory region so that pointers can only access memory regions of the same color. Allowing the color to be specified for every byte in memory would provide ideal memory safety detection properties. However, it would also impose significant metadata and performance overheads for storing, updating, retrieving, and propagating duplicated color values. Thus, memory tagging typically operates at a coarser granularity, e.g., 16 bytes (as shown in FIG. 2) or a whole cacheline.

A physical tagging approach may use a sequestered region of memory to store a table of tags (e.g., pointer metadata table 162) that are indexed by the physical address of the associated granule of data memory. This indexing scheme aligns well with tags being managed by memory controller 113, since the memory controller operates on physical addresses. For example, the sequestered memory may have a base physical address that is specified in a register in the memory controller, and the physical address of a tag associated with a granule of physical data memory may be computed by determining how far the physical address of the data granule is from the beginning of the tagged region of physical data memory, scaling that by a factor to account for the size of each data granule in proportion to the size of each stored color value, and adding the scaled index to the base address for the sequestered memory containing the metadata.

The memory controller 113 may load color values while loading associated data into the cache so that those color values can be stored alongside cacheline data in a logical construct called a "sidecar" herein. Some embodiments may only attach a sidecar to certain cache levels, e.g., level one (L1) and level two (L2) and not last level cache (LLC).

Even with a coarser granularity of 16 bytes, managing tags can impose substantial overhead if the memory controller waits to fill a cacheline until both the data and associated color values are available. This can be exacerbated by limitations in access granularity in the underlying physical memory (e.g., memory circuitry 114 implemented as dynamic random-access memory (DRAM)). For example, DRAM may require an entire row of metadata at a time to be energized, even if only a single nibble of metadata in that row is needed.

There are other technologies besides memory tagging that require fine-grained metadata. For example, Multi-Key Total Memory Encryption (MKTME), available from Intel Corporation, specifies a key ID to be used for each cacheline. However, a crucial distinction between how MKTME manages metadata and how physical memory tagging manages metadata is that MKTME supplies metadata from a processor core 118 instead of loading it from sequestered memory (e.g., in memory circuitry 114). This avoids the overheads of loading metadata from memory. What enables MKTME to manage metadata in this more efficient manner while still meeting the security requirements of its usages is that it binds data encryption to the metadata values, i.e., by using the metadata to select a key. Thus, an attempt to access a cacheline using an incorrect key ID results in data garbling. This does not require checking the attempted key ID against the correct key ID; the cryptography itself enforces isolation.

In contrast, memory tagging relies on architectural checks between pointer colors and memory colors to enforce isolation. The underlying data in existing memory tagging approaches is left unencrypted. However, memory tagging has the advantage of detecting memory safety violations immediately within the particular access that violates the memory safety policy.

As described herein, these disparate approaches are hybridized to 1) minimize metadata overheads; 2) immediately detect memory safety violations; and 3) cryptographically enforce memory safety.

The technology described herein uses this hybrid approach is to interpret per-granule metadata as both a color value for memory tagging and a key ID for MKTME or other memory encryption approach. For example, encryption and decryption may occur closer to the processing core than in MKTME (e.g., between the L1 and L2 caches).

The deepest cache level in which cachelines are decrypted as plaintext can read in just data as is currently done when filling a cacheline and speculate on the color/key ID values. In an embodiment, that speculation may be informed by the pointer used to access a portion of the cacheline by passing the color bits from the pointer all the way to the decryption engines along with the physical address. Alternatively, to avoid needing to pass color bits, especially if the decryption engines are deep in the computing environment (such as in a SoC), perhaps in the memory controller, the color bit speculation may be informed by the color in any cachelines for nearby physical addresses, that is, guessing that they may be part of the same allocation, or by some other strategy, such as guessing randomly.

Some prefetchers, specifically the ones prefetching into caches closer to the processing core than the decryption engines, would also need to speculate on colors to be used in prefetches. Those prefetchers could use similar speculation strategies as those described above.

The metadata would not need to be loaded simultaneously from sequestered memory (e.g., a protected portion of memory circuitry 114). A request for the metadata may be enqueued at the level of the caching hierarchy where cachelines are first stored as plaintext. Multiple requests may be combined to maximize the probability of multiple requested metadata items residing near each other in memory such that they can be read as a single request from DRAM or a cache.

When the metadata is eventually loaded from memory circuitry 114 or cache 120, the metadata may be forwarded through the cache hierarchy to be loaded into the sidecars associated with the corresponding data lines. Meanwhile, to account for the possibility of mis-speculated metadata being used as the basis for decisions, cachelines may be enhanced with additional information to indicate the status of the metadata in those cachelines, as well as any decisions that have been made based on that metadata.

Figure 3:
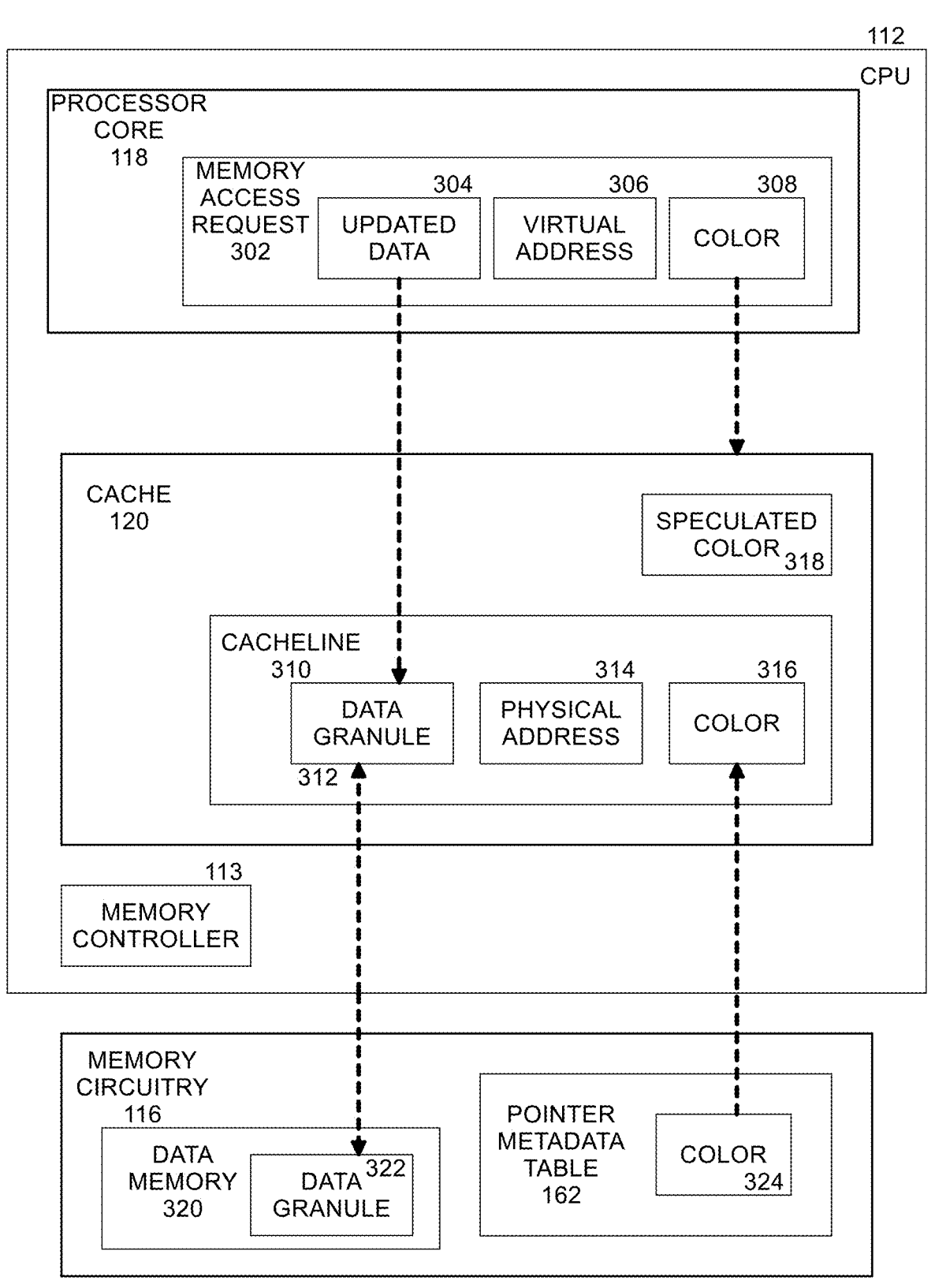
FIG. 3 is a diagram of using a speculated color value in an example.

FIG. 3 is a diagram of using a speculated color value in an example. A processor core 118 of CPU 112 may generate a memory access request 302 when access is needed to data that is stored in one or more of cache 120 and memory circuitry 114. When memory access request 302 indicates that data in memory is to be written, memory access request 302 includes updated data 304 to be stored in memory circuitry 114. Memory access request 302 includes information from a pointer (e.g., pointer 210) to the data, including virtual address 306 and color 308 (where tag 212 in this approach comprises color 308). When the cacheline storing the requested data is not in cache 120, processor core 118 requests that cacheline 310 of cache 120 be loaded from memory circuitry 114. Cacheline 310 includes one or more data granules 312, physical address 314, and one or more colors 316. Cache 120 receives the color 308 from the memory access request 302. Cache 120 determines speculated color 318 while awaiting a (definitive) color 324 from pointer metadata table 162 in memory circuitry 114. In an example, cache 120 determines the speculated color 318 based at least in part on other, previous memory access requests or other cachelines. Cache 120 returns speculated color 318 for the processor core to optionally and provisionally use the speculated color 318 instead of color 324 from the pointer metadata table 162 (and while waiting for color 324), thereby improving the efficiency of processor core 118.

Processor core 118 may subsequently fetch color 316 from cacheline 310 (after color 324 of pointer metadata table 162 is loaded into cacheline 310 (replacing color 316)) containing data granule(s) 312 of cache 120 whose physical address 314 is associated with virtual address 306 in the memory access request 302. Data granule 322 of data memory 320 in memory circuitry 114 may be used by memory controller 113 and cache 120 to update data granule 312 in cacheline 310. In an embodiment, speculated color 318 in cache 120 may be made available to processor core 118 faster than color 324 from pointer metadata table 162 in memory circuitry 114, since access by processor core 118 to cache 120 is faster than access to memory circuitry 114.

Figure 4:
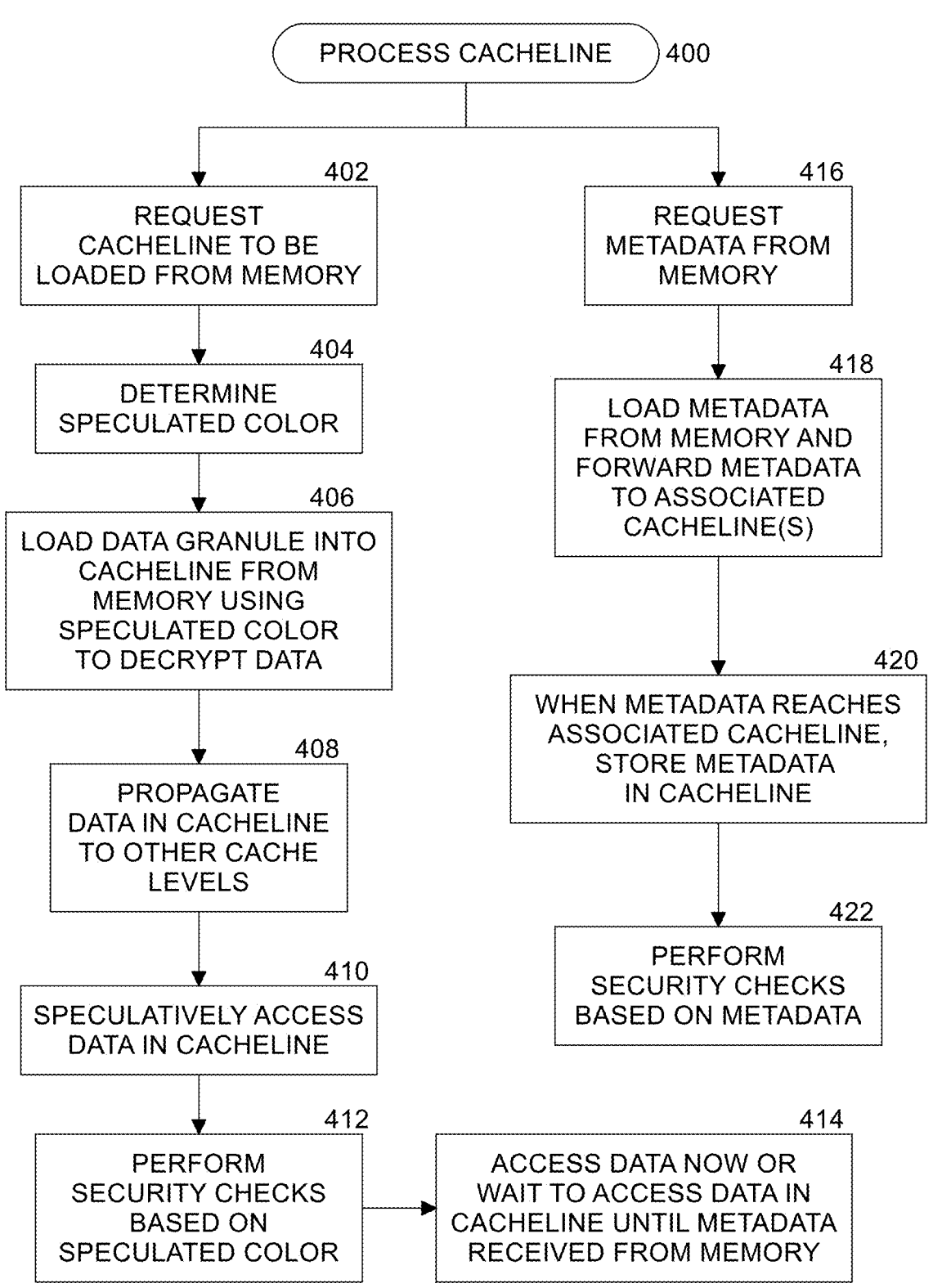
FIG. 4 is a flow diagram of cacheline processing according to an example.

FIG. 4 is a flow diagram of cacheline processing 400 according to an example. Blocks 402 through 412 for data processing and blocks 416 through 422 for metadata processing may be performed in parallel. At block 402, processor core 118 sends a memory access request 302 (including updated data 304 for a write request, virtual address 306, and color 308 from a pointer) to request a cacheline 310 to be loaded from memory 114. At block 404, cache 120 determines a speculated color 318 for the memory access request 302. At block 406, memory controller 113 loads data granule 322 from data memory 320 of memory circuitry 114 into cacheline 310 using speculated color 318 to decrypt the data (e.g., by encryption and decryption circuitry 122). At block 408, cache 120 optionally propagates data in data granule 312 of cacheline 310 to other cache levels. At block 410, processor core 118 optionally speculatively accesses data in data granule 312 of cacheline 310 (since the data is now decrypted). At block 412, one or more of processor core 118, cache 120, and/or pointer security circuitry 126 performs security checks (e.g., memory safety checks) based at least in part on the speculated color 318. At block 414, if the security checks pass, processor core 118 accesses the decrypted data or optionally waits to access the data in the cacheline until metadata (including the (definitive) color 324) from pointer metadata table 162 is received from memory and then the data is decrypted using color 324.

At block 416, processor core 118 requests metadata (including color 324) from pointer metadata table 162 associated with the pointer indicated by the memory access request 302. At block 418, memory controller loads metadata from the pointer metadata table in memory circuitry 114 and forwards the metadata to associated one or more cachelines 310. In an embodiment, loading metadata takes longer than loading data. At block 420, when the metadata reaches the associated one or more cachelines, processor core 118 and/or cache stores the metadata in cacheline 310. At block 422, one or more of cache 120, and/or pointer security circuitry 126 performs security checks (e.g., memory safety checks) based at least in part on the metadata, including color 324. Performance of the security checks may include updating selected MSR bits for hardware threads that previously accessed the cacheline 310. If the processor core waited at block 414, then the processor core now proceeds with the access to the data based on the results of the security checking of block 422.

Figure 5:
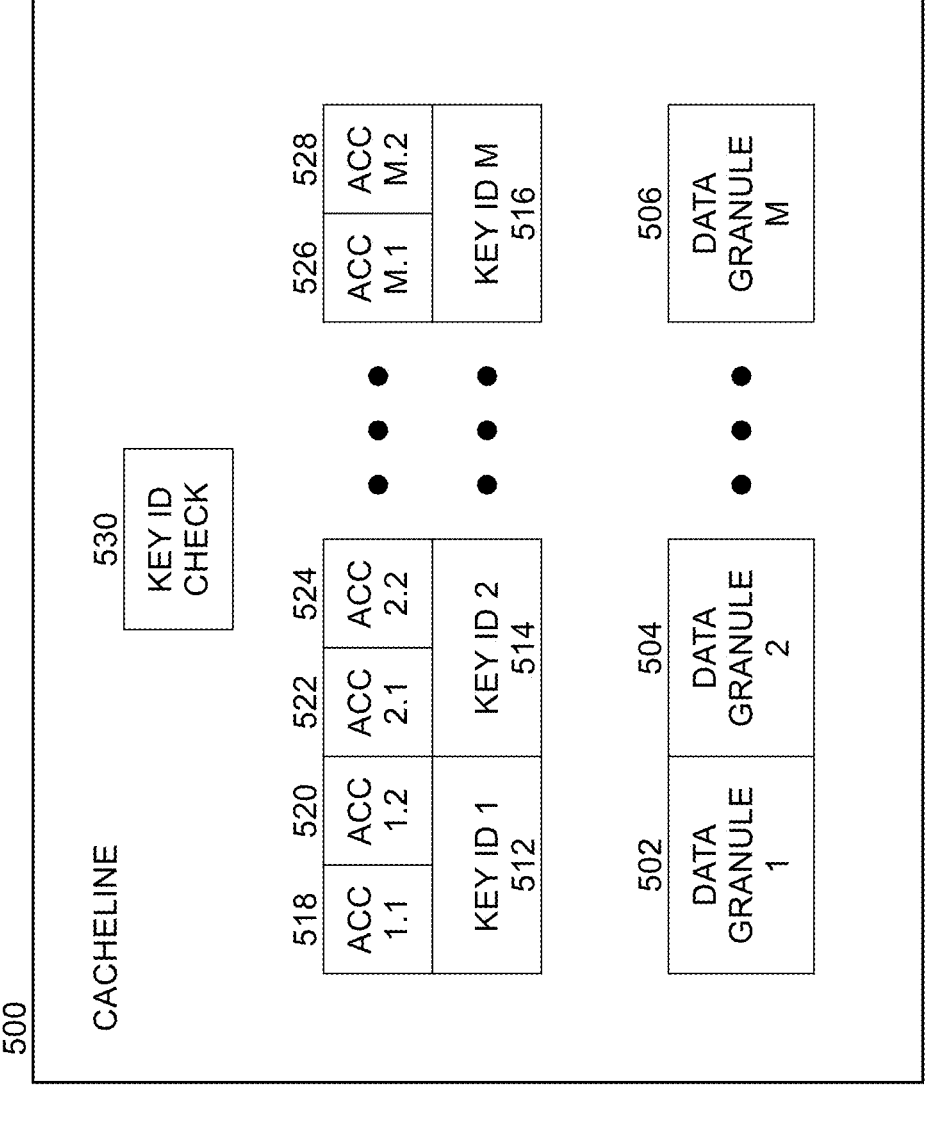
FIG. 5 illustrates data, metadata, and status bits pertaining to the metadata and how the metadata has been used, all within a cacheline, according to an example.

FIG. 5 illustrates data, metadata, and status bits pertaining to the metadata and how the metadata has been used, all within a cacheline 500 according to an example. Cacheline 500 (e.g., an example of cacheline 310) of cache 120 includes a plurality of data granules, shown here as data granule 1 502, data granule 2 504, . . . data granule M 506, where M is a natural number. In an embodiment, each data granule has an associated key ID and a plurality of access bits. For example, data granule 1 502 is associated with key ID 1 512 and access (ACC) bits 1.1 518 and 1.2 520, data granule 2 504 is associated with key ID 2 514 and access (ACC) bits 2.1 522 and 2.2 524, . . . data granule M 506 is associated with key ID M 516 and access (ACC) bits M.1 526 and M.2 528. A data granule is decrypted with the data granule's associated Key ID (also called a color herein). In one implementation, the number of access bits associated with each data granule is equal to the number of processing threads in processor core 118. For example, if there are two processing threads, then there are two access bits for each data granule, as shown in FIG. 5. In an embodiment, the Key IDs and access bits collectively are known as the "sidecar" to the cacheline. If key IDs may be speculated within caches that are shared across multiple processor cores, then a separate ACC bit may be defined for each processing thread that may access each unit of data granule storage in the cache.

Data of a data granule will be decrypted incorrectly if the Key ID (color) for the data granule is mis-speculated. Data will be "repaired" later when the correct Key ID (color) is loaded from pointer metadata table 162. Access bits indicate whether each data granule was accessed (either read access or write access) using the current Key ID encoded in the cacheline 500. The access bits may be used to detect asynchronously whether a memory safety violation occurred due to an access with an incorrect Key ID. A per-hardware (HW) thread access bit is reserved for the Key ID storage for each data granule. If the asynchronous mode is not supported, then the access bits are unused. Key ID check 530 indicates whether the Key IDs have been checked against the pointer metadata table 162. Key IDs may be speculated based at least in part on accesses and prefetches until Key ID check 530 is set.

Either synchronous or asynchronous violation reporting may be supported, depending on what status bits are maintained. In either case, the data may be forwarded prior to checking the metadata, since the cryptography would protect the data in a mis-speculated transient execution.

If data is not encrypted, but rather just color checks are performed, then Key IDs as indicated in FIG. 5 are treated as colors.

Supporting speculative metadata affects several cache flows, including accessing data from the cache, moving data between caches, and checking asynchronously for memory safety violations. Furthermore, a new cache flow is needed for allowing metadata to be joined into a cacheline that already contains data.

Figure 6A:
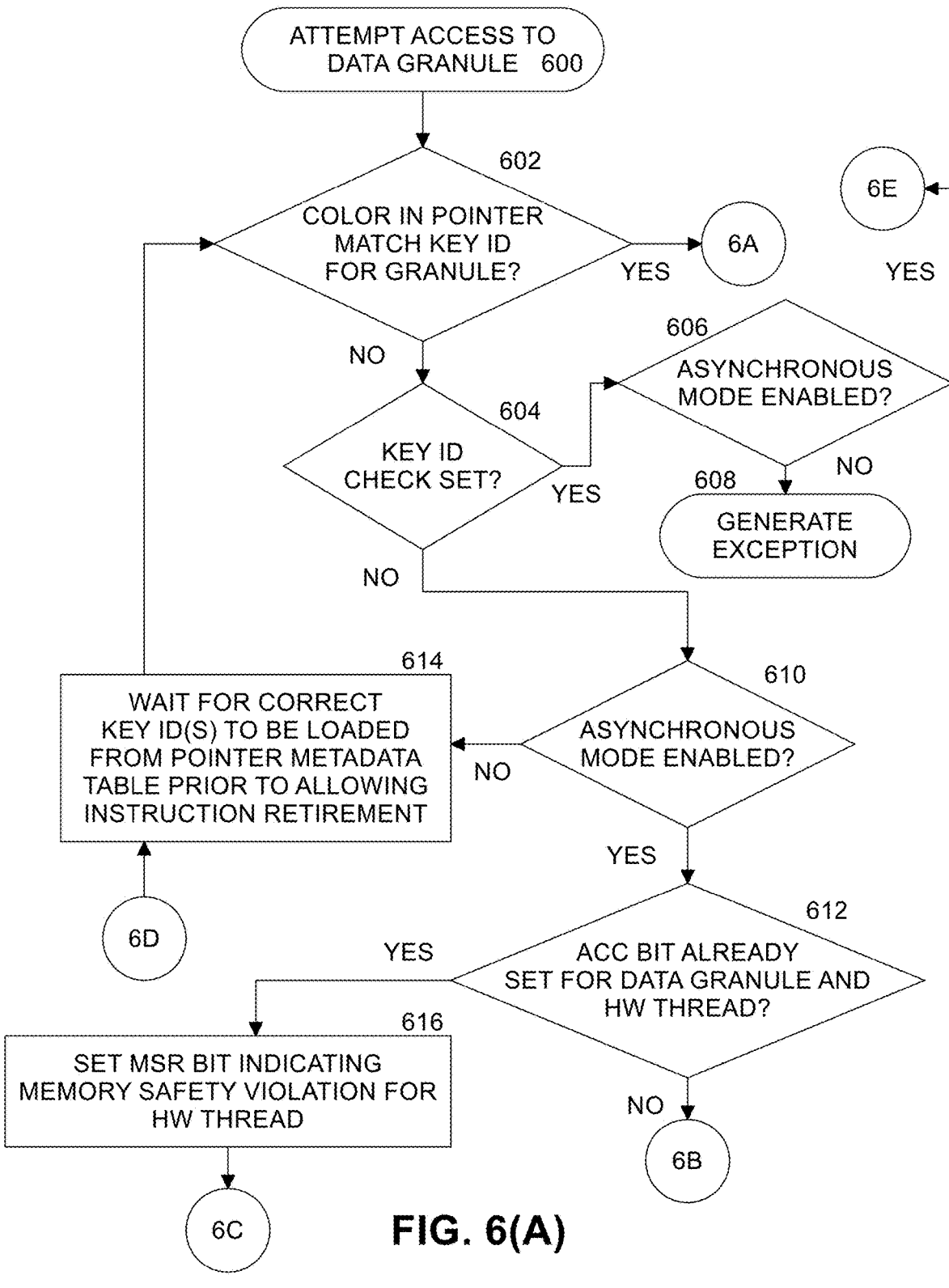
FIGS. 6(A) and 6(B) are flow diagrams illustrating processing for accessing data from the cache according to an example.
Figure 6B:
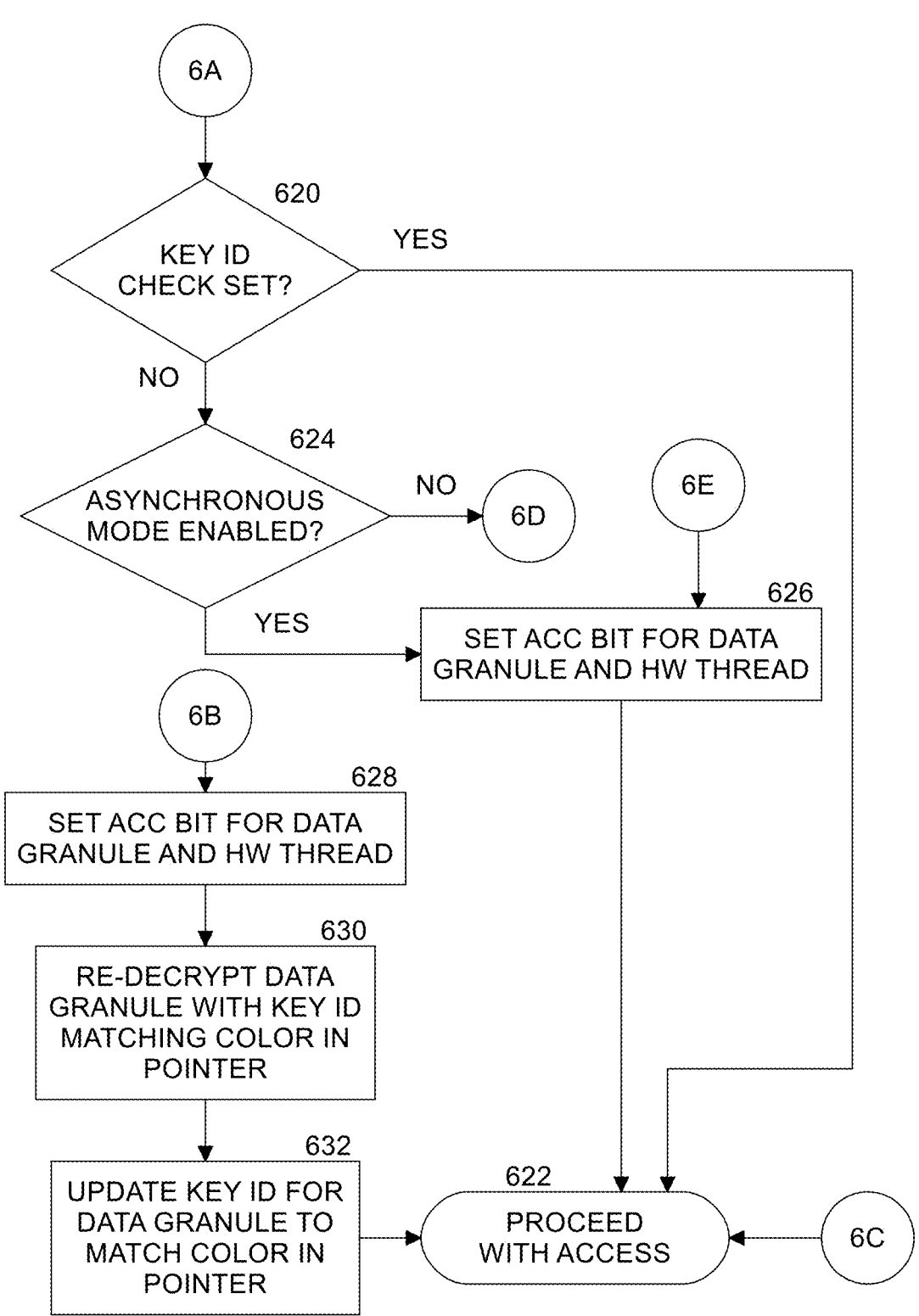

FIGS. 6(A) and 6(B) are flow diagrams illustrating processing for accessing data from the cache 120 according to an example. At block 600, an attempt to access a data granule is generated by processor core 118. At block 602, pointer security circuitry 126 determines if the color 308 in the pointer of the memory access request 302 matches the Key ID for the data granule to be accessed in a cacheline. If the color 308 matches the Key ID for the data granule to be accessed, then processing continues at block 620 on FIG. 6(B) via connector 6A. At block 620, pointer security circuitry 126 determines if the Key ID check 530 is set for the cacheline. If so, access to the data proceeds at block 622. If not, then pointer security circuitry 126 determines at block 624 if asynchronous mode is enabled. If so, at block 626, pointer security circuitry 126 requests that cache 120 set the access (ACC) bit for the data granule and the HW thread (executing on the processor core) attempting to access the data granule. If not, processing goes back to block 614 on FIG. 1 via connector 6D. At block 614, processor core 118 waits for the correct Key ID(s) to be loaded from pointer metadata table 162 prior to allowing instruction retirement. However, data from the data granule may still be forwarded speculatively while waiting. After the waiting for loading of Key ID(s) from the pointer metadata table is complete, processing continues with block 602.

At block 602, if the color 308 in the pointer of the memory access request 302 does not match the Key ID for the data granule to be accessed in a cacheline, then at block 604, pointer security circuitry 126 determines if Key ID check 530 is set for the cacheline. If so, at block 606, pointer security circuitry 126 determines if asynchronous mode is enabled. If so, processing continues with block 626 of FIG. 6(B) via connector 6E. Otherwise an exception is generated at block 608 due to the color mismatch. At block 604, if the Key ID check 530 is not set, then at block 610 pointer security circuitry 126 determines if asynchronous mode is enabled. If not, processing continues at block 614 with waiting for the corrects Key ID(s) to be loaded. If asynchronous mode is enabled at block 610, then at block 612 pointer security circuitry 126 determines if the access bit is already set for the data granule and the HW thread. If the access bit is not set, then processing continues with block 628 on FIG. 6(B) via connector 6B. At block 628, pointer security circuitry 126 requests that cache 120 set the access bit for the data granule and the HW thread. At block 630, encryption and decryption circuitry 122 of CPU 112 re-decrypts the data granule with the Key ID matching the color in the pointer (in the memory access request). At block 632, pointer security circuitry 126 requests that cache 120 update the Key ID for the data granule in the cacheline in the cache to match the color in the pointer. Access to the data in the data granule then proceeds. If the access bit is set at block 612, in an embodiment cache 120 requests that processor core 118 set a model specific register (MSR) 123 in processor core 118 indicating a memory safety violation has occurred for the HW thread. Processing then continues with block 622 on FIG. 6(B) via connector 6C, where access to the data proceeds.

Figure 7:
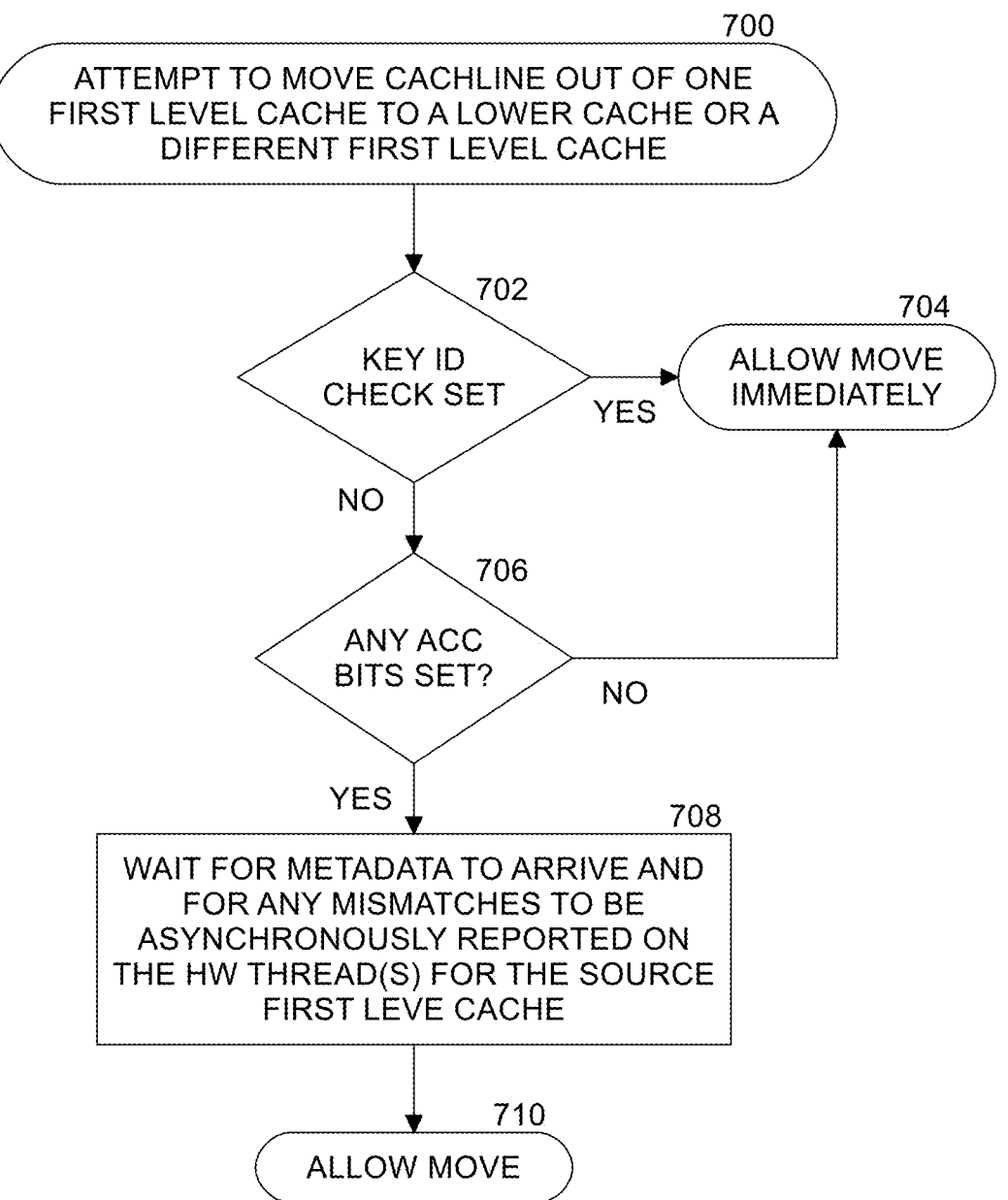
FIG. 7 is a flow diagram illustrating processing for moving data between caches according to an example.

FIG. 7 is a flow diagram illustrating processing for moving data between caches according to an example. At block 700, an attempt to move a cacheline out of one first-level cache to a lower cache or a different first-level cache is received. Recall that cache 120 comprises one or more levels of caches. At block 702, cache 120 determines if the Key ID check 530 is set for the cacheline. If Key ID check 530 is set, the move is allowed immediately. If the Key ID check 530 is not set, then at block 706 cache 120 determines if any access bits are set for the cacheline. If not, the move is allowed immediately at block 704. If any access bits are set, then at block 708 cache 120 waits for metadata (e.g., the Key ID/color) to arrive from pointer metadata table 162 in memory circuitry 114 and for any mismatches to be asynchronously reported on the HW thread(s) for the source first-level cache. Once the wait is complete and the reporting is accomplished, the cacheline is allowed to be moved at block 710. This will require redirecting the metadata to the new cache holding the cacheline when that metadata arrives. If the cacheline is moved to a lower cache, then the lower cache would have already intercepted the metadata, so this is only relevant if the cacheline is moved to a different first-level cache. For example, perhaps the source first-level cache may broadcast the metadata when the source first-level cache detects that it no longer contains the cacheline. Alternatively, the source first-level cache may reclaim ownership of the cacheline once the metadata arrives. In another alternative, the source first-level cache may maintain a list of forward references to the destination first-level cache for the cacheline.

Figure 8:
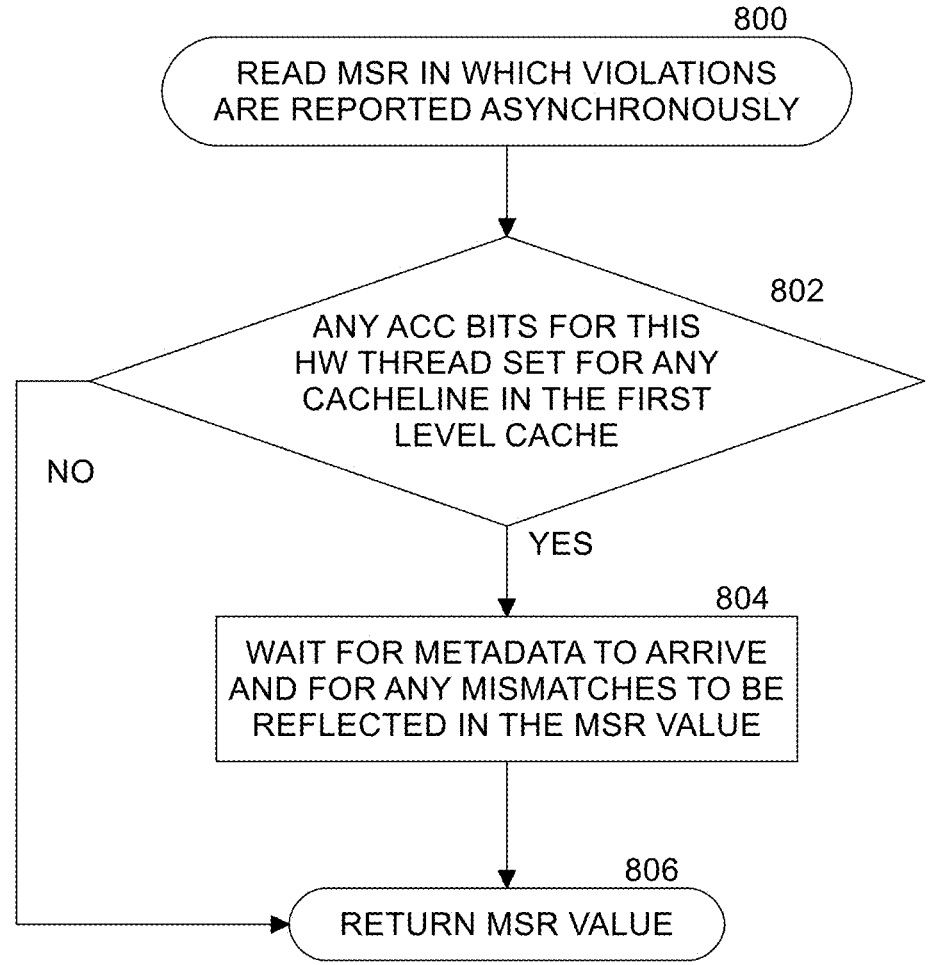
FIG. 8 is a flow diagram illustrating processing for checking asynchronously for memory safety violations according to an example.

FIG. 8 is a flow diagram illustrating processing for checking asynchronously for memory safety violations according to an example. At block 800, processor core 118 reads the MSR 123 in which violations are reported asynchronously. At block 802, if any access bits for the HW thread are set for any cacheline in any of the caches that track accesses, then at block 804, processor core 118 waits for metadata to arrive and for any mismatches to be reflected in the MSR value. At block 806, processor core 118 returns the MSR value to the software that read the MSR, e.g., the operating system. If no access bits are set at block 802, then processor core 118 returns the MSR value to the software that read the MSR at block 806. In an embodiment, the access bits for each cache may be held in a centralized structure, thereby making this check more efficient, rather than distributed among the cachelines.

FIG. 9 is a flow diagram illustrating processing for allowing metadata to be joined into a cacheline that already contains data in an example. At block 900, metadata arrives at a cacheline containing data (e.g., in data granules) and access indicators. At block 902, if the speculated Key ID (e.g., speculated color 318) matches the Key ID stored in the memory circuitry 114 (e.g., color 324 of pointer metadata table 162), then the Key ID check 530 is set at block 914. If the speculated Key ID does not match the Key ID stored in the memory circuitry 114, at block 904 the mi-speculated Key ID in the cacheline is replaced with the stored Key ID and the data granule is re-decrypted. At block 906, if any access bit is set for the data granule processing, then at block 908, cache 120 determines if any memory access is blocked synchronously waiting for the metadata from the pointer metadata table 162 in memory circuitry 114. If a memory access is blocked synchronously, then at block 910 an exception is generated for the oldest memory access blocked on waiting for the metadata. The Key ID check bit is then set at block 914. If no access bits are set for the data granule at block 906, then at block 912 the MSR bit that asynchronously indicates a memory safety violation is set by cache 120. If no memory accesses are blocked synchronously at block 908, then at block 912 the MSR bit that asynchronously indicates a memory safety violation is set by the cache. Processing continues with setting the Key ID check bit at block 914.

Both the access flow of FIGS. 6(A) and 6(B) and the flow for metadata arriving at a cacheline of FIG. 9 depend on the ability to selectively re-decrypt granules using updated color values. This requires access by cache 120 to data encryption and decryption units of encryption and decryption circuitry 122. In an embodiment, encryption and decryption circuitry 122 may be included in cache 120. The data must first be re-encrypted using the current color value and then re-decrypted using the updated color value. The crypto units may exist at a particular level of the cache hierarchy, e.g., between the memory controller and the LLC. In that case, the affected cacheline may be evicted to the LLC level, processed cryptographically by the crypto units, and then returned to the cache that it occupied when the operation occurred that triggered the re-encryption.

Alternatively, additional cryptographic units may be placed at various levels of the cache hierarchy to more flexibly accommodate re-decryption requests with lower latency and less traffic between caches.

Placing the cryptographic units at a shallow cache level may lead to relatively less performance overhead from re-decryption, since access operations that trigger re-decryption will frequently be accessing data that is already present in the L1 cache. Placing cryptographic units at a shallow cache level will minimize the distance that the data needs to travel to be re-decrypted.

By removing the cryptographic operations from the flow of FIGS. 6(A) and 6(B) above, the technology described herein may also be used to speculate color values for non-cryptographic memory tagging. However, as data is forwarded to the pipeline due to color checks mis-speculated as passing either during transient execution or in asynchronous checking mode, the data will only be cryptographically protected (i.e., garbled) if data encryption is implemented.

The metadata must be directed towards its corresponding data to be joined with the data. A simple approach would be to broadcast any loaded metadata throughout the entire cache hierarchy so that the loaded metadata will reach any corresponding data wherever it resides in the cache hierarchy. However, that would generate significant traffic throughout the cache hierarchy.

Some cache subsystems record directory information to locate particular cachelines, which may be used to more efficiently locate any cachelines with corresponding data. The metadata request queue entry could also record which shallower cache requested the metadata so that the metadata can be directed straight to that cache.

An alternative to setting indicators in cachelines and waiting for metadata to be joined with data before performing associated checks would be to forward the access request deeper into the cache hierarchy, even if the data is available at a shallower level of cache. Eventually, that request will reach the metadata, which may already have been loaded and is traveling upward in the cache or that has not yet been loaded from memory. In that latter case, the request will eventually reach the level of cache that issues metadata requests, cause a metadata request to be issued, and then wait for the metadata to be returned and checked.

The metadata may be encrypted (e.g., using a designated key ID), in DRAM and levels of caches where it is treated as ordinary data.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 10:
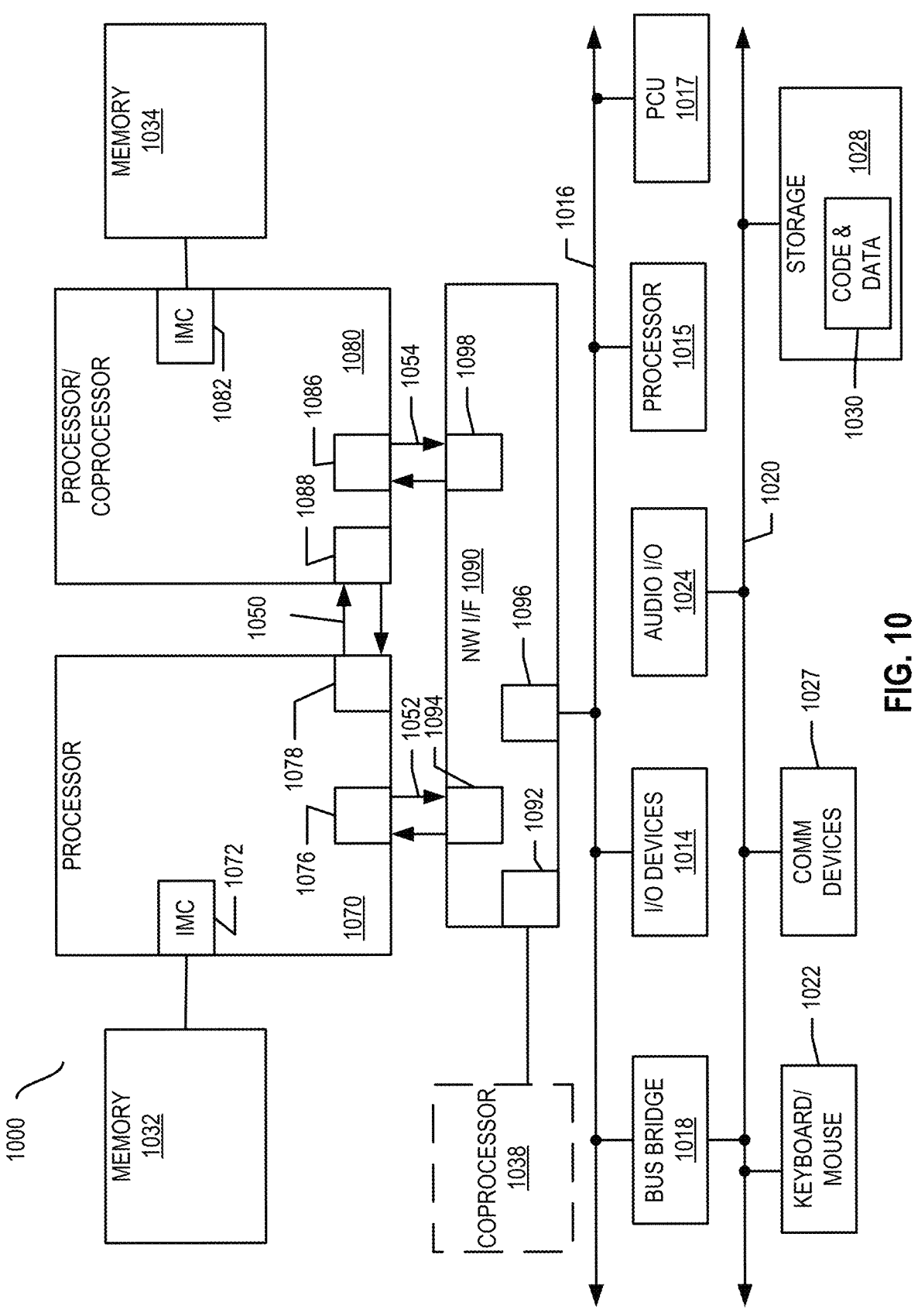
FIG. 10 illustrates an example computing system.

FIG. 10 illustrates an example computing system. Multiprocessor system 1000 is an interfaced system and includes a plurality of processors or cores including a first processor 1070 and a second processor 1080 coupled via an interface 1050 such as a point-to-point (P-P) interconnect, a fabric, and/or bus. In some examples, the first processor 1070 and the second processor 1080 are homogeneous. In some examples, first processor 1070 and the second processor 1080 are heterogenous. Though the example system 1000 is shown to have two processors, the system may have three or more processors, or may be a single processor system. In some examples, the computing system is a system on a chip (SoC).

Processors 1070 and 1080 are shown including integrated memory controller (IMC) circuitry 1072 and 1082, respectively. Processor 1070 also includes interface circuits 1076 and 1078; similarly, second processor 1080 includes interface circuits 1086 and 1088. Processors 1070, 1080 may exchange information via the interface 1050 using interface circuits 1078, 1088. IMCs 1072 and 1082 couple the processors 1070, 1080 to respective memories, namely a memory 1032 and a memory 1034, which may be portions of main memory locally attached to the respective processors.

Processors 1070, 1080 may each exchange information with a network interface (NW I/F) 1090 via individual interfaces 1052, 1054 using interface circuits 1076, 1094, 1086, 1098. The network interface 1090 (e.g., one or more of an interconnect, bus, and/or fabric, and in some examples is a chipset) may optionally exchange information with a coprocessor 1038 via an interface circuit 1092. In some examples, the coprocessor 1038 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1070, 1080 or outside of both processors, yet connected with the processors via an interface such as P-P interconnect, such that either or both processors' local cache information may be stored in the shared cache if a processor is placed into a low power mode.

Network interface 1090 may be coupled to a first interface 1016 via interface circuit 1096. In some examples, first interface 1016 may be an interface such as a Peripheral Component Interconnect (PCI) interconnect, a PCI Express interconnect or another I/O interconnect. In some examples, first interface 1016 is coupled to a power control unit (PCU) 1017, which may include circuitry, software, and/or firmware to perform power management operations with regard to the processors 1070, 1080 and/or co-processor 1038. PCU 1017 provides control information to a voltage regulator (not shown) to cause the voltage regulator to generate the appropriate regulated voltage. PCU 1017 also provides control information to control the operating voltage generated. In various examples, PCU 1017 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1017 is illustrated as being present as logic separate from the processor 1070 and/or processor 1080. In other cases, PCU 1017 may execute on a given one or more of cores (not shown) of processor 1070 or 1080. In some cases, PCU 1017 may be implemented as a microcontroller (dedicated or general-purpose) or other control logic configured to execute its own dedicated power management code, sometimes referred to as P-code. In yet other examples, power management operations to be performed by PCU 1017 may be implemented externally to a processor, such as by way of a separate power management integrated circuit (PMIC) or another component external to the processor. In yet other examples, power management operations to be performed by PCU 1017 may be implemented within BIOS or other system software.

Various I/O devices 1014 may be coupled to first interface 1016, along with a bus bridge 1018 which couples first interface 1016 to a second interface 1020. In some examples, one or more additional processor(s) 1015, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 1016. In some examples, second interface 1020 may be a low pin count (LPC) interface. Various devices may be coupled to second interface 1020 including, for example, a keyboard and/or mouse 1022, communication devices 1027 and storage circuitry 1028. Storage circuitry 1028 may be one or more non-transitory machine-readable storage media as described below, such as a disk drive or other mass storage device which may include instructions/code and data 1030 and may implement the storage 'ISAB03 in some examples. Further, an audio I/O 1024 may be coupled to second interface 1020. Note that other architectures than the point-to-point architecture described above are possible. For example, instead of the point-to-point architecture, a system such as multiprocessor system 1000 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 11:
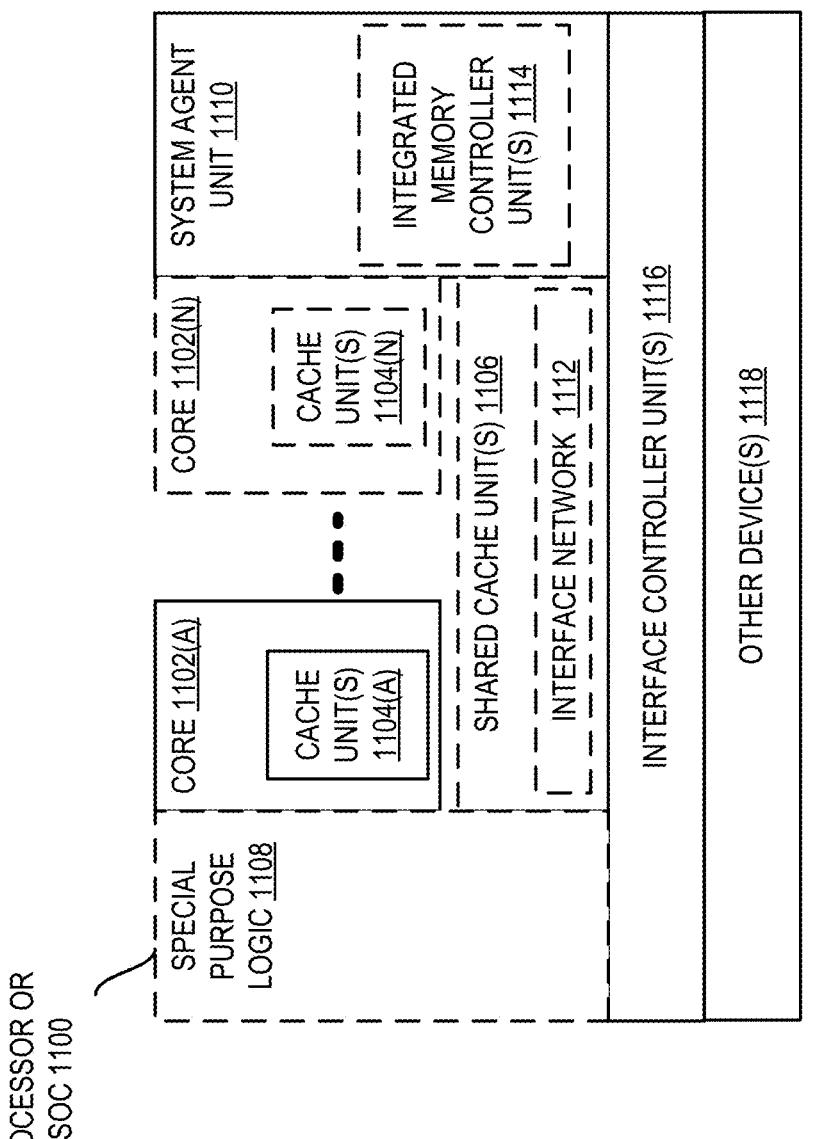
FIG. 11 illustrates a block diagram of an example processor and/or System on a Chip (SoC) that may have one or more cores and an integrated memory controller.

FIG. 11 illustrates a block diagram of an example processor and/or SoC 1100 that may have one or more cores and an integrated memory controller. The solid lined boxes illustrate a processor 1100 with a single core 1102(A), system agent unit circuitry 1110, and a set of one or more interface controller unit(s) circuitry 1116, while the optional addition of the dashed lined boxes illustrates an alternative processor 1100 with multiple cores 1102(A)-(N), a set of one or more integrated memory controller unit(s) circuitry 1114 in the system agent unit circuitry 1110, and special purpose logic 1108, as well as a set of one or more interface controller units circuitry 1116. Note that the processor 1100 may be one of the processors 1070 or 1080, or co-processor 1038 or 1015 of FIG. 10.

Thus, different implementations of the processor 1100 may include: 1) a CPU with the special purpose logic 1108 being integrated graphics and/or scientific (throughput) logic (which may include one or more cores, not shown), and the cores 1102(A)-(N) being one or more general purpose cores (e.g., general purpose in-order cores, general purpose out-of-order cores, or a combination of the two); 2) a coprocessor with the cores 1102(A)-(N) being a large number of special purpose cores intended primarily for graphics and/or scientific (throughput); and 3) a coprocessor with the cores 1102(A)-(N) being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1104(A)-(N) within the cores 1102(A)-(N), a set of one or more shared cache unit(s) circuitry 1106, and external memory (not shown) coupled to the set of integrated memory controller unit(s) circuitry 1114. The set of one or more shared cache unit(s) circuitry 1106 may include one or more mid-level caches, such as level 2 (L2), level 3 (L3), level 4 (L4), or other levels of cache, such as a last level cache (LLC), and/or combinations thereof. While in some examples interface network circuitry 1112 (e.g., a ring interconnect) interfaces the special purpose logic 1108 (e.g., integrated graphics logic), the set of shared cache unit(s) circuitry 1106, and the system agent unit circuitry 1110, alternative examples use any number of well-known techniques for interfacing such units. In some examples, coherency is maintained between one or more of the shared cache unit(s) circuitry 1106 and cores 1102(A)-(N). In some examples, interface controller units circuitry 1116 couple the cores 1102 to one or more other devices 1118 such as one or more I/O devices, storage, one or more communication devices (e.g., wireless networking, wired networking, etc.), etc.

In some examples, one or more of the cores 1102(A)-(N) are capable of multi-threading. The system agent unit circuitry 1110 includes those components coordinating and operating cores 1102(A)-(N). The system agent unit circuitry 1110 may include, for example, power control unit (PCU) circuitry and/or display unit circuitry (not shown). The PCU may be or may include logic and components needed for regulating the power state of the cores 1102(A)-(N) and/or the special purpose logic 1108 (e.g., integrated graphics logic). The display unit circuitry is for driving one or more externally connected displays.

The cores 1102(A)-(N) may be homogenous in terms of instruction set architecture (ISA). Alternatively, the cores 1102(A)-(N) may be heterogeneous in terms of ISA; that is, a subset of the cores 1102(A)-(N) may be capable of executing an ISA, while other cores may be capable of executing only a subset of that ISA or another ISA.

Example Core Architectures—In-Order and Out-of-Order Core Block Diagram.

Figure 12A:
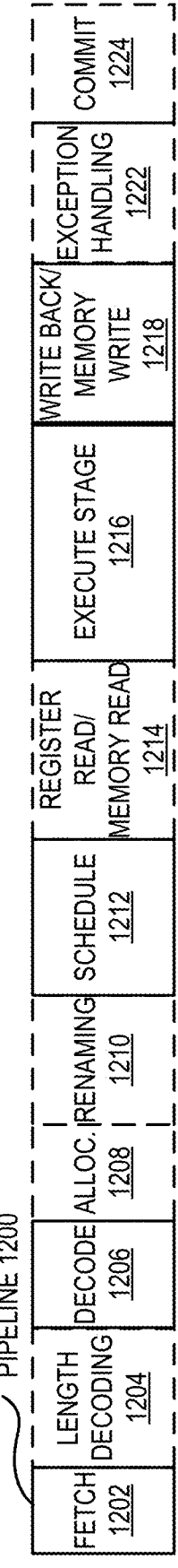
FIG. 12(A) is a block diagram illustrating both an example in-order pipeline and an example register renaming, out-of-order issue/execution pipeline according to examples.
Figure 12B:
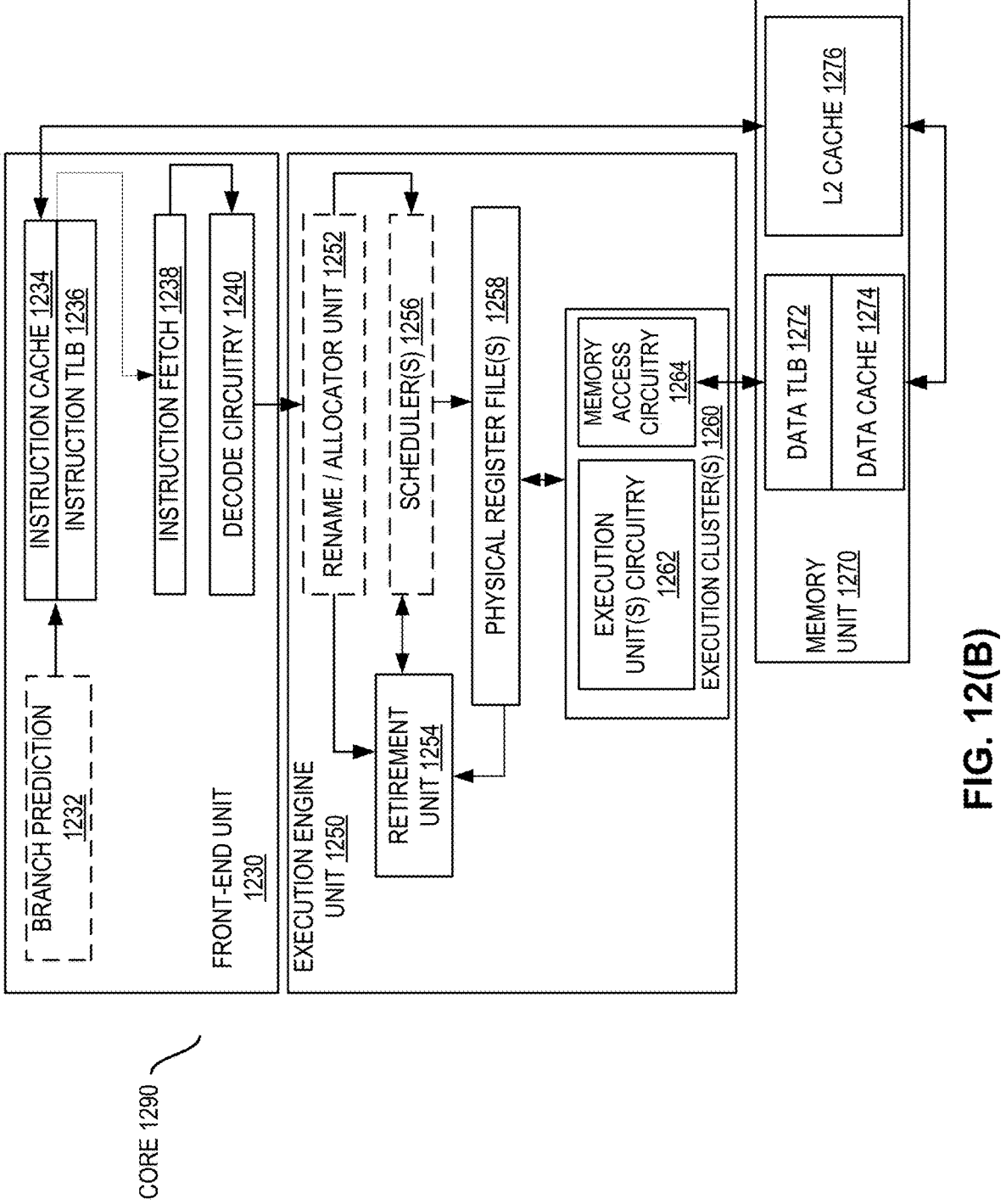
FIG. 12(B) is a block diagram illustrating both an example in-order architecture core and an example register renaming, out-of-order issue/execution architecture core to be included in a processor according to examples.

FIG. 12(A) is a block diagram illustrating both an example in-order pipeline and an example register renaming, out-of-order issue/execution pipeline according to examples. FIG. 12(B) is a block diagram illustrating both an example in-order architecture core and an example register renaming, out-of-order issue/execution architecture core to be included in a processor according to examples. The solid lined boxes in FIGS. 12(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12(A), a processor pipeline 1200 includes a fetch stage 1202, an optional length decoding stage 1204, a decode stage 1206, an optional allocation (Alloc) stage 1208, an optional renaming stage 1210, a schedule (also known as a dispatch or issue) stage 1212, an optional register read/memory read stage 1214, an execute stage 1216, a write back/memory write stage 1218, an optional exception handling stage 1222, and an optional commit stage 1224. One or more operations can be performed in each of these processor pipeline stages. For example, during the fetch stage 1202, one or more instructions are fetched from instruction memory, and during the decode stage 1206, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1206 and the register read/memory read stage 1214 may be combined into one pipeline stage. In one example, during the execute stage 1216, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 12(B) may implement the pipeline 1200 as follows: 1) the instruction fetch circuitry 1238 performs the fetch and length decoding stages 1202 and 1204; 2) the decode circuitry 1240 performs the decode stage 1206; 3) the rename/allocator unit circuitry 1252 performs the allocation stage 1208 and renaming stage 1210; 4) the scheduler(s) circuitry 1256 performs the schedule stage 1212; 5) the physical register file(s) circuitry 1258 and the memory unit circuitry 1270 perform the register read/memory read stage 1214; the execution cluster(s) 1260 perform the execute stage 1216; 6) the memory unit circuitry 1270 and the physical register file(s) circuitry 1258 perform the write back/memory write stage 1218; 7) various circuitry may be involved in the exception handling stage 1222; and 8) the retirement unit circuitry 1254 and the physical register file(s) circuitry 1258 perform the commit stage 1224.

FIG. 12(B) shows a processor core 1290 including front-end unit circuitry 1230 coupled to execution engine unit circuitry 1250, and both are coupled to memory unit circuitry 1270. The core 1290 may be a reduced instruction set architecture computing (RISC) core, a complex instruction set architecture computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front-end unit circuitry 1230 may include branch prediction circuitry 1232 coupled to instruction cache circuitry 1234, which is coupled to an instruction translation lookaside buffer (TLB) 1236, which is coupled to instruction fetch circuitry 1238, which is coupled to decode circuitry 1240. In one example, the instruction cache circuitry 1234 is included in the memory unit circuitry 1270 rather than the front-end circuitry 1230. The decode circuitry 1240 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1240 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1240 may be implemented using various different mechanisms. Examples of suitable mechanisms include, but are not limited to, look-up tables, hardware implementations, programmable logic arrays (PLAs), microcode read only memories (ROMs), etc. In one example, the core 1290 includes a microcode ROM (not shown) or other medium that stores microcode for certain macroinstructions (e.g., in decode circuitry 1240 or otherwise within the front-end circuitry 1230). In one example, the decode circuitry 1240 includes a micro-operation (micro-op) or operation cache (not shown) to hold/cache decoded operations, micro-tags, or micro-operations generated during the decode or other stages of the processor pipeline 1200. The decode circuitry 1240 may be coupled to rename/allocator unit circuitry 1252 in the execution engine circuitry 1250.

The execution engine circuitry 1250 includes the rename/allocator unit circuitry 1252 coupled to retirement unit circuitry 1254 and a set of one or more scheduler(s) circuitry 1256. The scheduler(s) circuitry 1256 represents any number of different schedulers, including reservations stations, central instruction window, etc. In some examples, the scheduler(s) circuitry 1256 can include arithmetic logic unit (ALU) scheduler/scheduling circuitry, ALU queues, address generation unit (AGU) scheduler/scheduling circuitry, AGU queues, etc. The scheduler(s) circuitry 1256 is coupled to the physical register file(s) circuitry 1258. Each of the physical register file(s) circuitry 1258 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1258 includes vector registers unit circuitry, writemask registers unit circuitry, and scalar register unit circuitry. These register units may provide architectural vector registers, vector mask registers, general-purpose registers, etc. The physical register file(s) circuitry 1258 is coupled to the retirement unit circuitry 1254 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1254 and the physical register file(s) circuitry 1258 are coupled to the execution cluster(s) 1260. The execution cluster(s) 1260 includes a set of one or more execution unit(s) circuitry 1262 and a set of one or more memory access circuitry 1264. The execution unit(s) circuitry 1262 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1256, physical register file(s) circuitry 1258, and execution cluster(s) 1260 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1264). It should also be understood that where separate pipelines are used, one or more of these pipelines may be out-of-order issue/execution and the rest in-order.

In some examples, the execution engine unit circuitry 1250 may perform load store unit (LSU) address/data pipelining to an Advanced Microcontroller Bus (AMB) interface (not shown), and address phase and writeback, data phase load, store, and branches.

The set of memory access circuitry 1264 is coupled to the memory unit circuitry 1270, which includes data TLB circuitry 1272 coupled to data cache circuitry 1274 coupled to level 2 (L2) cache circuitry 1276. In one example, the memory access circuitry 1264 may include load unit circuitry, store address unit circuitry, and store data unit circuitry, each of which is coupled to the data TLB circuitry 1272 in the memory unit circuitry 1270. The instruction cache circuitry 1234 is further coupled to the level 2 (L2) cache circuitry 1276 in the memory unit circuitry 1270. In one example, the instruction cache 1234 and the data cache 1274 are combined into a single instruction and data cache (not shown) in L2 cache circuitry 1276, level 3 (L3) cache circuitry (not shown), and/or main memory. The L2 cache circuitry 1276 is coupled to one or more other levels of cache and eventually to a main memory.

The core 1290 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1290 includes logic to support a packed data instruction set architecture extension (e.g., AVX1, AVX2), thereby allowing the operations used by many multimedia applications to be performed using packed data.
Example Execution Unit(s) Circuitry.

Figure 13:
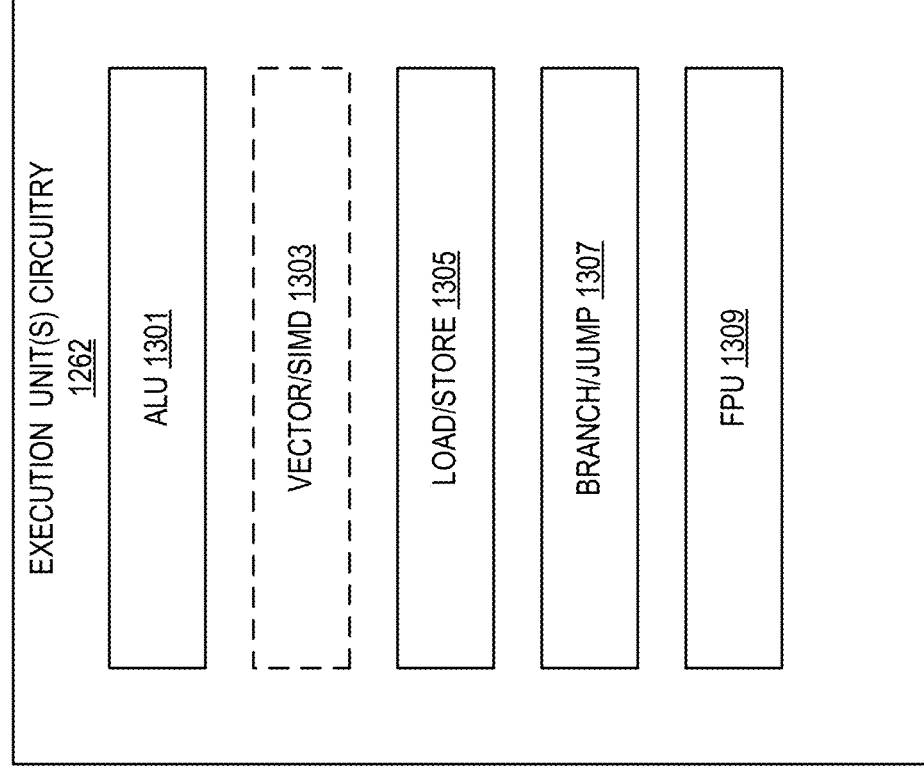
FIG. 13 illustrates examples of execution unit(s) circuitry.

FIG. 13 illustrates examples of execution unit(s) circuitry, such as execution unit(s) circuitry 1262 of FIG. 12(B). As illustrated, execution unit(s) circuitry 1262 may include one or more ALU circuits 1301, optional vector/single instruction multiple data (SIMD) circuits 1303, load/store circuits 1305, branch/jump circuits 1307, and/or Floating-point unit (FPU) circuits 1309. ALU circuits 1301 perform integer arithmetic and/or Boolean operations. Vector/SIMD circuits 1303 perform vector/SIMD operations on packed data (such as SIMD/vector registers). Load/store circuits 1305 execute load and store instructions to load data from memory into registers or store from registers to memory. Load/store circuits 1305 may also generate addresses. Branch/jump circuits 1307 cause a branch or jump to a memory address depending on the instruction. FPU circuits 1309 perform floating-point arithmetic. The width of the execution unit(s) circuitry 1262 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 14:
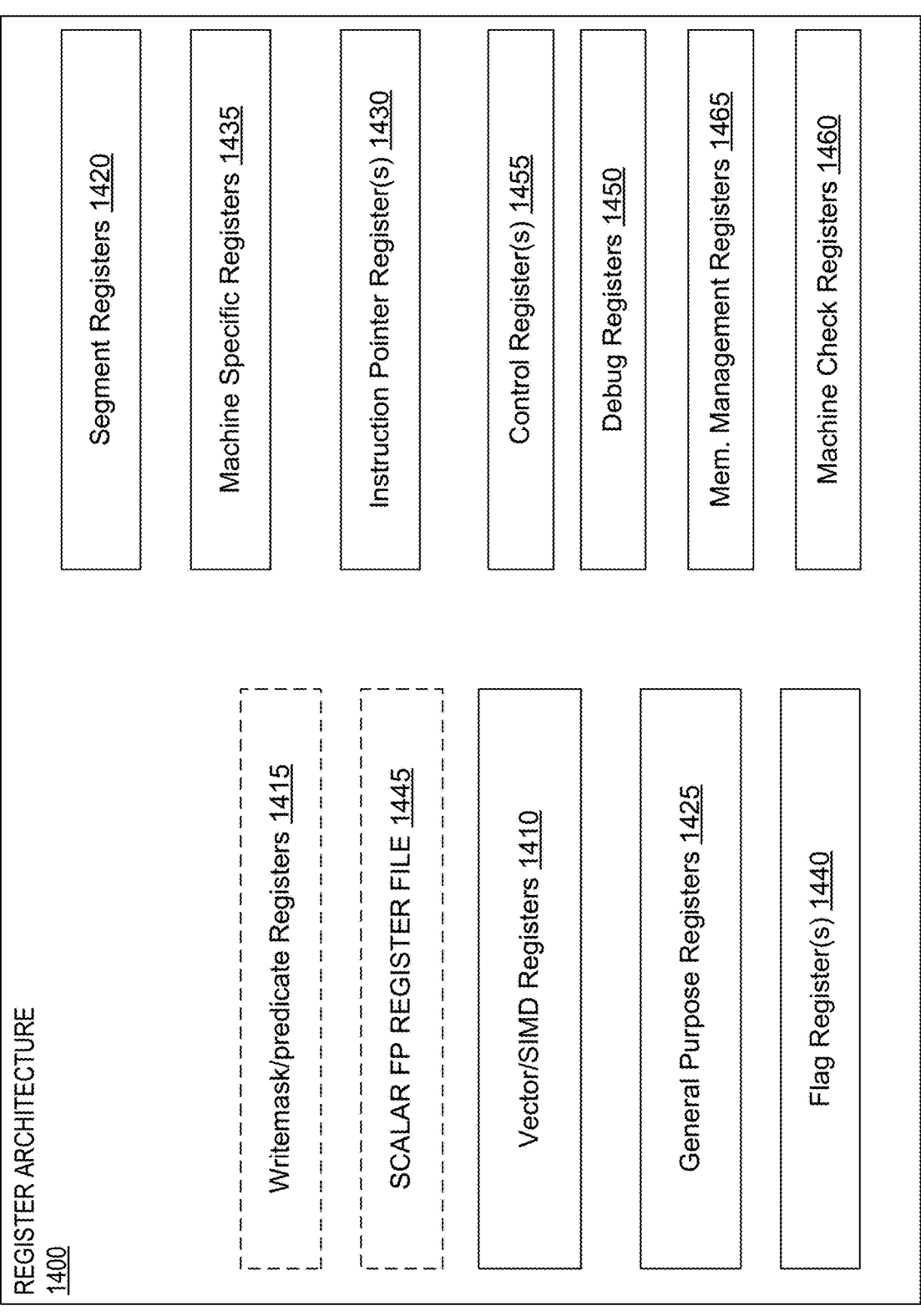
FIG. 14 is a block diagram of a register architecture according to some examples.

FIG. 14 is a block diagram of a register architecture 1400 according to some examples. As illustrated, the register architecture 1400 includes vector/SIMD registers 1410 that vary from 128-bit to 1,024 bits width. In some examples, the vector/SIMD registers 1410 are physically 512-bits and, depending upon the mapping, only some of the lower bits are used. For example, in some examples, the vector/SIMD registers 1410 are ZMIM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1400 includes writemask/predicate registers 1415. For example, in some examples, there are 8 writemask/predicate registers (sometimes called k0 through k7) that are each 16-bit, 32-bit, 64-bit, or 128-bit in size. Writemask/predicate registers 1415 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1415 corresponds to a data element position of the destination. In other examples, the writemask/predicate registers 1415 are scalable and consists of a set number of enable bits for a given vector element (e.g., 8 enable bits per 64-bit vector element).

The register architecture 1400 includes a plurality of general-purpose registers 1425. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1400 includes scalar floating-point (FP) register file 1445 which is used for scalar floating-point operations on 32/64/80-bit floating-point data using the x87 instruction set architecture extension or as MMX registers to perform operations on 64-bit packed integer data, as well as to hold operands for some operations performed between the MMX and XMIVI registers.

One or more flag registers 1440 (e.g., EFLAGS, RFLAGS, etc.) store status and control information for arithmetic, compare, and system operations. For example, the one or more flag registers 1440 may store condition code information such as carry, parity, auxiliary carry, zero, sign, and overflow. In some examples, the one or more flag registers 1440 are called program status and control registers.

Segment registers 1420 contain segment points for use in accessing memory. In some examples, these registers are referenced by the names CS, DS, SS, ES, FS, and GS.

Machine specific registers (MSRs) 1435 control and report on processor performance. Most MSRs 1435 handle system-related functions and are not accessible to an application program. Machine check registers 1460 consist of control, status, and error reporting MSRs that are used to detect and report on hardware errors.

One or more instruction pointer register(s) 1430 store an instruction pointer value. Control register(s) 1455 (e.g., CR0-CR4) determine the operating mode of a processor (e.g., processor 1070, 1080, 1038, 1015, and/or 1100) and the characteristics of a currently executing task. Debug registers 1450 control and allow for the monitoring of a processor or core's debugging operations.

Memory (mem) management registers 1465 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1400 may, for example, be used in register file/memory 'ISAB08, or physical register file(s) circuitry 12 58. Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.
Example Instruction Formats.

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 15:
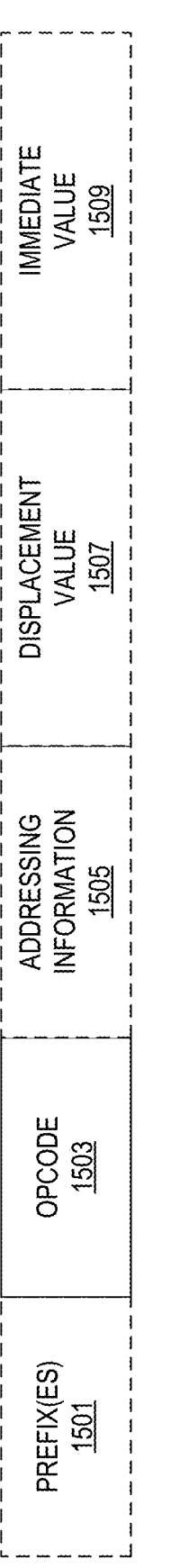
FIG. 15 illustrates examples of an instruction format.

FIG. 15 illustrates examples of an instruction format. As illustrated, an instruction may include multiple components including, but not limited to, one or more fields for: one or more prefixes 1501, an opcode 1503, addressing information 1505 (e.g., register identifiers, memory addressing information, etc.), a displacement value 1507, and/or an immediate value 1509. Note that some instructions utilize some or all the fields of the format whereas others may only use the field for the opcode 1503. In some examples, the order illustrated is the order in which these fields are to be encoded, however, it should be appreciated that in other examples these fields may be encoded in a different order, combined, etc.

The prefix(es) field(s) 1501, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow "legacy" prefixes.

The opcode field 1503 is used to at least partially define the operation to be performed upon a decoding of the instruction. In some examples, a primary opcode encoded in the opcode field 1503 is one, two, or three bytes in length. In other examples, a primary opcode can be a different length. An additional 3-bit opcode field is sometimes encoded in another field.

Figure 16:
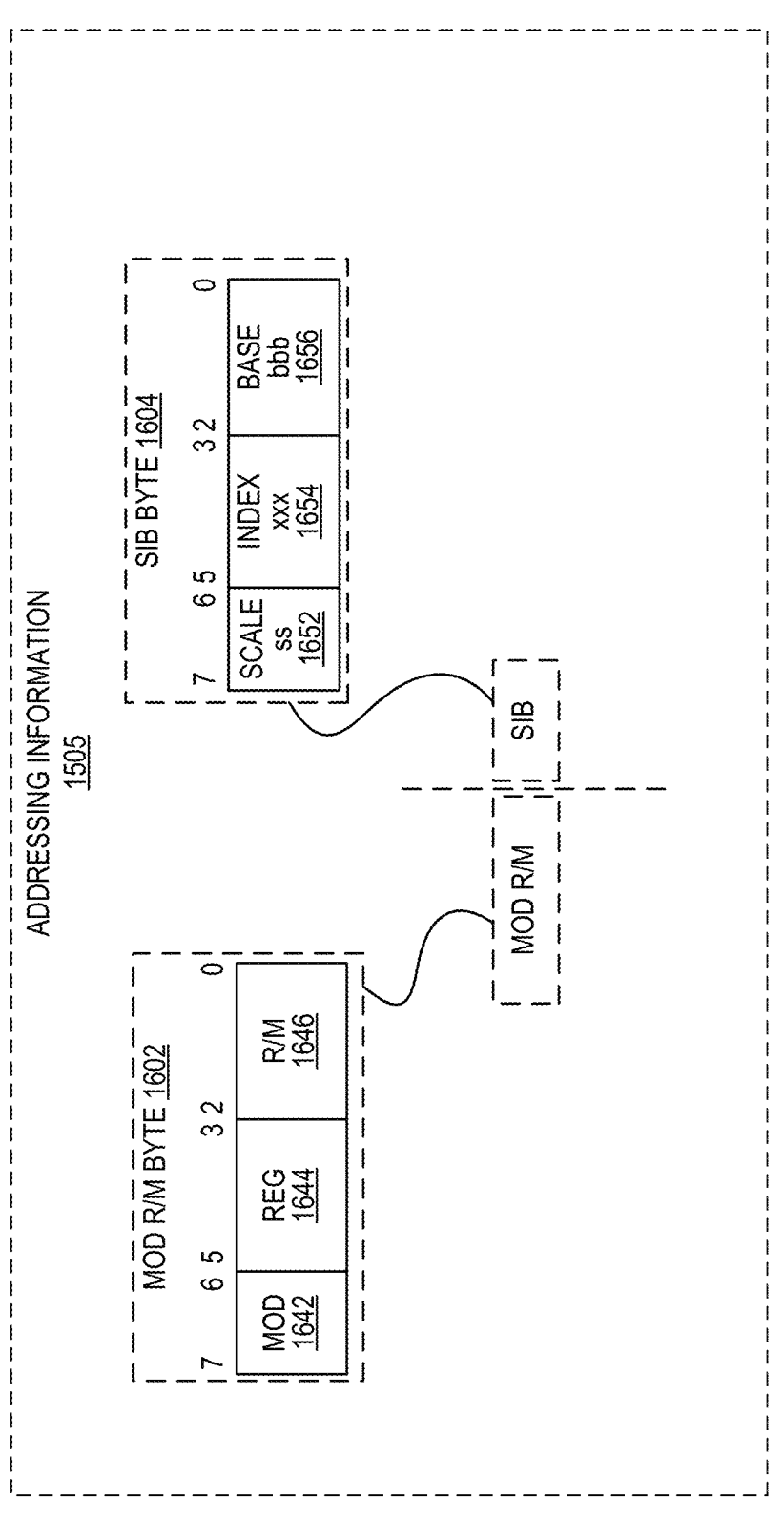
FIG. 16 illustrates examples of an addressing information field.

The addressing information field 1505 is used to address one or more operands of the instruction, such as a location in memory or one or more registers. FIG. 16 illustrates examples of the addressing information field 1505. In this illustration, an optional MOD R/M byte 1602 and an optional Scale, Index, Base (SIB) byte 1604 are shown. The MOD R/M byte 1602 and the SIB byte 1604 are used to encode up to two operands of an instruction, each of which is a direct register or effective memory address. Note that both of these fields are optional in that not all instructions include one or more of these fields. The MOD R/M byte 1602 includes a MOD field 1642, a register (reg) field 1644, and R/M field 1646.

The content of the MOD field 1642 distinguishes between memory access and non-memory access modes. In some examples, when the MOD field 1642 has a binary value of 11 (11b), a register-direct addressing mode is utilized, and otherwise a register-indirect addressing mode is used.

The register field 1644 may encode either the destination register operand or a source register operand or may encode an opcode extension and not be used to encode any instruction operand. The content of register field 1644, directly or through address generation, specifies the locations of a source or destination operand (either in a register or in memory). In some examples, the register field 1644 is supplemented with an additional bit from a prefix (e.g., prefix 1501) to allow for greater addressing.

The R/M field 1646 may be used to encode an instruction operand that references a memory address or may be used to encode either the destination register operand or a source register operand. Note the R/M field 1646 may be combined with the MOD field 1642 to dictate an addressing mode in some examples.

The SIB byte 1604 includes a scale field 1652, an index field 1654, and a base field 1656 to be used in the generation of an address. The scale field 1652 indicates a scaling factor. The index field 1654 specifies an index register to use. In some examples, the index field 1654 is supplemented with an additional bit from a prefix (e.g., prefix 1501) to allow for greater addressing. The base field 1656 specifies a base register to use. In some examples, the base field 1656 is supplemented with an additional bit from a prefix (e.g., prefix 1501) to allow for greater addressing. In practice, the content of the scale field 1652 allows for the scaling of the content of the index field 1654 for memory address generation (e.g., for address generation that uses $2^{scale}*index+base$).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1507 provides this value. Additionally, in some examples, a displacement factor usage is encoded in the MOD field of the addressing information field 1505 that indicates a compressed displacement scheme for which a displacement value is calculated and stored in the displacement field 1507.

In some examples, the immediate value field 1509 specifies an immediate value for the instruction. An immediate value may be encoded as a 1-byte value, a 2-byte value, a 4-byte value, etc.

Figures 17, 18A, 18B, 18C, 18D:
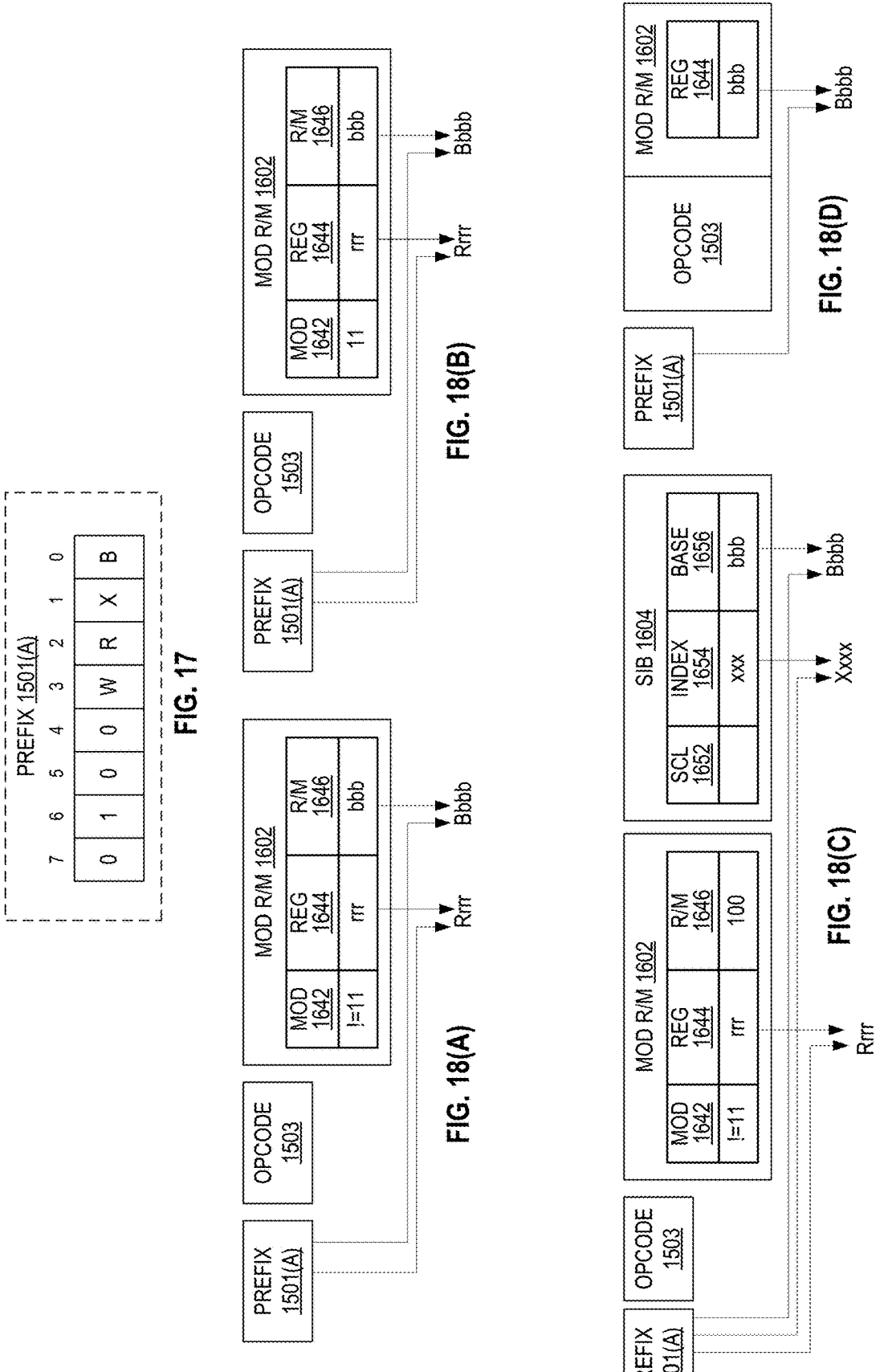
FIG. 17 illustrates examples of a first prefix.
FIGS. 18(A)-(D) illustrate examples of how the R, X, and B fields of the first prefix in FIG. 17 are used.

FIG. 17 illustrates examples of a first prefix 1501(A). In some examples, the first prefix 1501(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1501(A) may specify up to three registers using 3-bit fields depending on the format: 1) using the reg field 1644 and the R/M field 1646 of the MOD R/M byte 1602; 2) using the MOD R/M byte 1602 with the SIB byte 1604 including using the reg field 1644 and the base field 1656 and index field 1654; or 3) using the register field of an opcode.

In the first prefix 1501(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1644 and MOD R/M R/M field 1646 alone can each only address 8 registers.

In the first prefix 1501(A), bit position 2 (R) may be an extension of the MOD R/M reg field 1644 and may be used to modify the MOD R/M reg field 1644 when that field encodes a general-purpose register, a 64-bit packed data register (e.g., a SSE register), or a control or debug register. R is ignored when MOD R/M byte 1602 specifies other registers or defines an extended opcode.

Bit position 1 (X) may modify the SIB byte index field 1654.

Bit position 0 (B) may modify the base in the MOD R/M R/M field 1646 or the SIB byte base field 1656; or it may modify the opcode register field used for accessing general purpose registers (e.g., general purpose registers 1425).

FIGS. 18(A)-(D) illustrate examples of how the R, X, and B fields of the first prefix 1501(A) are used. FIG. 18(A) illustrates R and B from the first prefix 1501(A) being used to extend the reg field 1644 and R/M field 1646 of the MOD R/M byte 1602 when the SIB byte 16 04 is not used for memory addressing. FIG. 18(B) illustrates R and B from the first prefix 1501(A) being used to extend the reg field 1644 and R/M field 1646 of the MOD R/M byte 1602 when the SIB byte 16 04 is not used (register-register addressing). FIG. 18(C) illustrates R, X, and B from the first prefix 1501(A) being used to extend the reg field 1644 of the MOD R/M byte 1602 and the index field 1654 and base field 1656 when the SIB byte 16 04 being used for memory addressing. FIG. 18(D) illustrates B from the first prefix 1501(A) being used to extend the reg field 1644 of the MOD R/M byte 1602 when a register is encoded in the opcode 1503.

Figures 19A, 19B:
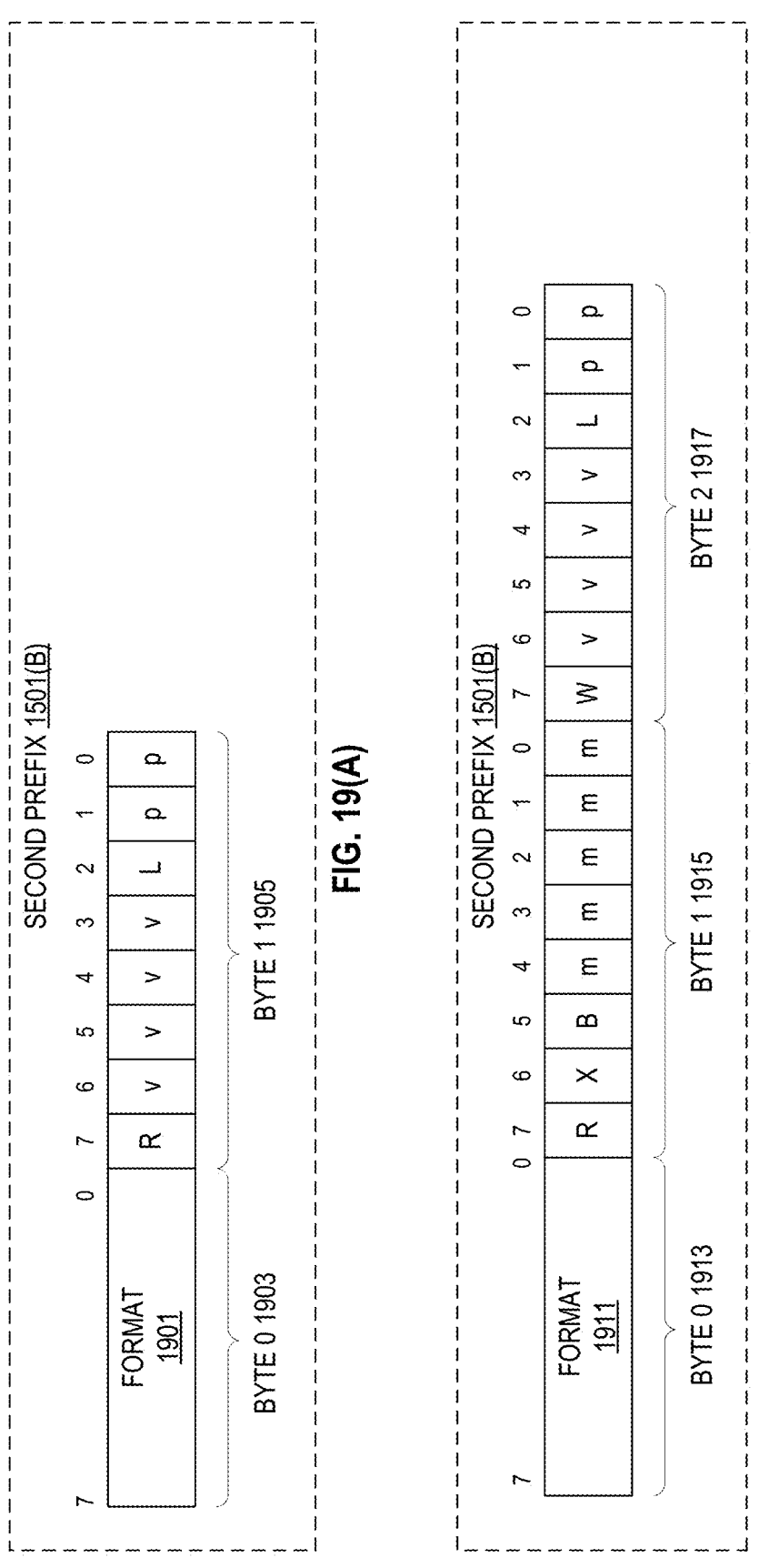
FIGS. 19(A)-(B) illustrate examples of a second prefix.

FIGS. 19(A)-(B) illustrate examples of a second prefix 1501(B). In some examples, the second prefix 1501(B) is an example of a VEX prefix. The second prefix 1501(B) encoding allows instructions to have more than two operands, and allows SIMD vector registers (e.g., vector/SIMD registers 1410) to be longer than 64-bits (e.g., 128-bit and 256-bit). The use of the second prefix 1501(B) provides for three-operand (or more) syntax. For example, previous two-operand instructions performed operations such as A=A+B, which overwrites a source operand. The use of the second prefix 1501(B) enables operands to perform nondestructive operations such as A=B+C.

In some examples, the second prefix 1501(B) comes in two forms—a two-byte form and a three-byte form. The two-byte second prefix 1501(B) is used mainly for 128-bit, scalar, and some 256-bit instructions; while the three-byte second prefix 1501(B) provides a compact replacement of the first prefix 1501(A) and 3-byte opcode instructions.

FIG. 19(A) illustrates examples of a two-byte form of the second prefix 1501(B). In one example, a format field 1901 (byte 0 1903) contains the value C5H. In one example, byte 1 1905 includes an "R" value in bit[7]. This value is the complement of the "R" value of the first prefix 1501(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1646 to encode the instruction operand that references a memory address or encode either the destination register operand or a source register operand.

Instructions that use this prefix may use the MOD R/M reg field 1644 to encode either the destination register operand or a source register operand, or to be treated as an opcode extension and not used to encode any instruction operand.

For instruction syntax that support four operands, vvvv, the MOD R/M R/M field 1646 and the MOD R/M reg field 1644 encode three of the four operands. Bits[7:4] of the immediate value field 1509 are then used to encode the third source register operand.

FIG. 19(B) illustrates examples of a three-byte form of the second prefix 1501(B). In one example, a format field 1911 (byte 0 1913) contains the value C4H. Byte 1 1915 includes in bits[7:5] "R," "X," and "B" which are the complements of the same values of the first prefix 1501(A). Bits[4:0] of byte 1 1915 (shown as mmmmm) include content to encode, as need, one or more implied leading opcode bytes. For example, 00001 implies a 0FH leading opcode, 00010 implies a 0F38H leading opcode, 00011 implies a 0F3AH leading opcode, etc.

Bit[7] of byte 2 1917 is used similar to W of the first prefix 1501(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the MOD R/M R/M field 1646 to encode the instruction operand that references a memory address or encode either the destination register operand or a source register operand.

Instructions that use this prefix may use the MOD R/M reg field 1644 to encode either the destination register operand or a source register operand, or to be treated as an opcode extension and not used to encode any instruction operand.

For instruction syntax that support four operands, vvvv, the MOD R/M R/M field 1646, and the MOD R/M reg field 1644 encode three of the four operands. Bits[7:4] of the immediate value field 1509 are then used to encode the third source register operand.

Figure 20:
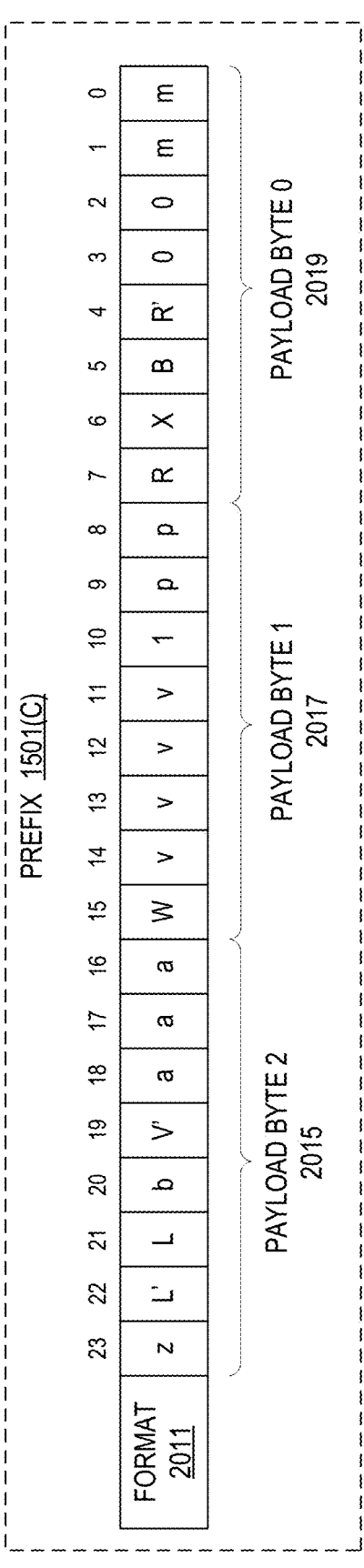
FIG. 20 illustrates examples of a third prefix.

FIG. 20 illustrates examples of a third prefix 1501(C). In some examples, the third prefix 1501(C) is an example of an EVEX prefix. The third prefix 1501(C) is a four-byte prefix.

The third prefix 1501(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 14) or predication utilize this prefix. Opmask register allow for conditional processing or selection control. Opmask instructions, whose source/destination operands are opmask registers and treat the content of an opmask register as a single value, are encoded using the second prefix 1501(B).

The third prefix 1501(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1501(C) is a format field 2011 that has a value, in one example, of 62H. Subsequent bytes are referred to as payload bytes 2015-2019 and collectively form a 24-bit value of P[23:0] providing specific capability in the form of one or more fields (detailed herein).

In some examples, P[1:0] of payload byte 2019 are identical to the low two mm bits. P[3:2] are reserved in some examples. Bit P[4] (R') allows access to the high 16 vector register set when combined with P[7] and the MOD R/M reg field 1644. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1644 and MOD R/M R/M field 1646.

P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1501(A) and second prefix 1511(B) and may serve as an opcode extension bit or operand size promotion.

P[18:16] specify the index of a register in the opmask (writemask) registers (e.g., writemask/predicate registers 1415). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 1501(C) are detailed in the following tables.

TABLE 1

| | | | 32-Register Support in 64-bit Mode | | |
|---|---|---|---|---|---|
| | 4 | 3 | [2:0] | REG. TYPE | COMMON USAGES |
| REG | R' | R | MOD R/M reg | GPR, Vector | Destination or Source |
| VVVV | V' | | vvvv | GPR, Vector | 2nd Source or Destination |

TABLE 1-continued

| 32-Register Support in 64-bit Mode | | | | | |
|---|---|---|---|---|---|
| | 4 | 3 | [2:0] | REG. TYPE | COMMON USAGES |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | MOD R/M reg | GPR, Vector | Destination or Source |
| VVVV | vvvv | GPR, Vector | $2^{nd}$ Source or Destination |
| RM | MOD R/M R/M | GPR, Vector | $1^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | MOD R/M Reg | k0-k7 | Source |
| VVVV | vvvv | k0-k7 | $2^{nd}$ Source |
| RM | MOD R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 21 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 21 shows a program in a high-level language 2102 may be compiled using a first ISA compiler 2104 to generate first ISA binary code 2106 that may be natively executed by a processor with at least one first ISA core 2116. The processor with at least one first ISA core 2116 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2104 represents a compiler that is operable to generate first ISA binary code 2106 (e.g., object code) that can, with or without additional linkage processing, be executed on the processor with at least one first ISA core 2116. Similarly, FIG. 21 shows the program in the high-level language 2102 may be compiled using an alternative ISA compiler 2108 to generate alternative ISA binary code 2110 that may be natively executed by a processor without a first ISA core 2114. The instruction converter 2112 is used to convert the first ISA binary code 2106 into code that may be natively executed by the processor without a first ISA core 2114. This converted code is not necessarily to be the same as the alternative ISA binary code 2110; however, the converted code will accomplish the general operation and be made up of instructions from the alternative ISA. Thus, the instruction converter 2112 represents software, firmware, hardware, or a combination thereof that, through emulation, simulation or any other process, allows a processor or other electronic device that does not have a first ISA processor or core to execute the first ISA binary code 2106.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

EXAMPLES

Example 1 is an apparatus including a processor core to request a cacheline to be loaded from a memory in a memory access request; and a cache to determine a speculated color value for the memory access request, receive a data granule of the cacheline from the memory, and decrypt data of the data granule using the speculated color value. In Example 2, the subject matter of Example 1 optionally includes the cache to propagate the decrypted data of the data granule to other levels of the cache. In Example 3, the subject matter of Example 1 optionally includes the processor core to speculatively access the decrypted data of the data granule. In Example 4, the subject matter of Example 3 optionally includes the processor core to set an access bit associated with the data granule and a hardware thread of the processor core when the processor core speculatively accesses the decrypted data of the data granule. In Example 5, the subject matter of Example 1 optionally includes the processor core to perform a memory safety check for accessing the decrypted data of the data granule based at least in part on the speculated color value.

In Example 6, the subject matter of Example 5 optionally includes the processor core to access the decrypted data when the memory safety check passes. In Example 7, the subject matter of Example 1 optionally includes wherein the speculated color value is a key identifier used for decrypting the data of the data granule and a memory tag used for performing a memory safety check for accessing the decrypted data of the data granule. In Example 8, the subject matter of Example 1 optionally includes the processor core to request metadata associated with the memory access request from the memory, and the cache to receive the metadata and store the metadata in the cacheline. In Example 9, the subject matter of Example 8 optionally includes the processor core to perform a memory safety check for accessing the decrypted data of the data granule based at least in part on a color value of the metadata and access the data decrypted using the color value when the memory safety check passes. In Example 10, the subject matter of Example 9 optionally includes the processor core to replace the speculated color value with the color value of the metadata and re-decrypt the data of the data granule using the color value of the metadata when the speculated color value does not match the color value of the metadata. In Example 11, the subject matter of Example 9 optionally includes wherein the processor core is to speculatively access the data decrypted using the speculative color value faster than the processor core is to access the data decrypted using the color value. In Example 12, the subject matter of Example 1 optionally includes the processor core to request the cacheline to be loaded from the memory when data to be accessed, the data being referenced by a pointer in a memory access request, is not in the cache. In Example 13, the subject matter of Example 11 optionally includes the cache to determine the speculated color value based at least in part on a previous memory access request.

Example 14 is a system including a memory to store a cacheline including a data granule; and a processor, the processor including a processor core to request the cacheline to be loaded from the memory in a memory access request; and a cache to determine a speculated color value for the memory access request, receive the data granule from the memory, and decrypt data of the data granule using the speculated color value. In Example 15, the subject matter of Example 14 optionally includes the cache to propagate the decrypted data of the data granule to other levels of the cache. In Example 16, the subject matter of Example 14 optionally includes the processor core to speculatively access the decrypted data of the data granule. In Example 17, the subject matter of Example 16 optionally includes the processor core to set an access bit associated with the data granule and a hardware thread of the processor core when the processor core speculatively accesses the decrypted data of the data granule. In Example 18, the subject matter of Example 14 optionally includes the processor core to perform a memory safety check for accessing the decrypted data of the data granule based at least in part on the speculated color value. In Example 19, the subject matter of Example 18 optionally includes the processor core to access the decrypted data when the memory safety check passes.

Example 20 is a method including requesting a cacheline to be loaded from a memory in a memory access request; determining a speculated color value for the memory access request; receiving a data granule of the cacheline from the memory; and decrypting data of the data granule using the speculated color value. In Example 21, the subject matter of Example 20 optionally includes wherein the speculated color value is a key identifier used for decrypting the data of the data granule and a memory tag used for performing a memory safety check for accessing the decrypted data of the data granule. In Example 22, the subject matter of Example 20 optionally includes requesting by a processor core, metadata associated with the memory access request from the memory, and receiving, by a cache, the metadata and store the metadata in the cacheline. In Example 23, the subject matter of Example 22 optionally includes performing a memory safety check for accessing the decrypted data of the data granule based at least in part on a color value of the metadata and accessing the data decrypted using the color value when the memory safety check passes. In Example 24, the subject matter of Example 23 optionally includes replacing the speculated color value with the color value of the metadata and re-decrypting the data of the data granule using the color value of the metadata when the speculated color value does not match the color value of the metadata. In Example 25, the subject matter of Example 24 optionally includes speculatively accessing, by the processor core, the data decrypted using the speculative color value faster accessing, by the processor core, the data decrypted using the color value. In Example 26, the subject matter of Example 20 optionally includes requesting the cacheline to be loaded from the memory when data to be accessed, the data being referenced by a pointer in a memory access request, is not in a cache. In Example 27, the subject matter of Example 25 optionally includes determining the speculated color value based at least in part on a previous memory access request.

Example 28 is an apparatus operative to perform the method of any one of Examples 20 to 27. Example 29 is an apparatus that includes means for performing the method of any one of Examples 20 to 27. Example 30 is an apparatus that includes any combination of modules and/or units and/or logic and/or circuitry and/or means operative to perform the method of any one of Examples 20 to 27. Example 31 is an optionally non-transitory and/or tangible machine-readable medium, which optionally stores or otherwise provides instructions that if and/or when executed by a computer system or other machine are operative to cause the machine to perform the method of any one of Examples 20 to 27.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
a processor core to request a cacheline to be loaded from a memory in a memory access request including a color value;
a cache to determine a speculated color value for the memory access request when a color value of metadata for a data granule of the cacheline is not stored in the cache, receive the data granule of the cacheline from the memory, and decrypt data of the data granule using the speculated color value; and
circuitry to check whether the speculated color value matches the color value in the memory access request.

2. An apparatus comprising:
a processor core to request a cacheline to be loaded from a memory in a memory access request including a color value;
a cache to determine a speculated color value for the memory access request, receive a data granule of the cacheline from the memory, and decrypt data of the data granule using the speculated color value; and
circuitry to check whether the speculated color value matches the color value in the memory access request, wherein the cache is to propagate the decrypted data of the data granule to other levels of the cache.

3. The apparatus of claim 1, comprising the processor core to speculatively access the decrypted data of the data granule.

4. The apparatus of claim 3, comprising the processor core to set an access bit associated with the data granule and a hardware thread of the processor core when the processor core speculatively accesses the decrypted data of the data granule.

5. The apparatus of claim 1, comprising the processor core to access the decrypted data when the speculated color value matches the color value in the memory access request.

6. The apparatus of claim 1, wherein the speculated color value is a key identifier used for decrypting the data of the data granule and a memory tag used for performing a memory safety check for accessing the decrypted data of the data granule.

7. The apparatus of claim 1, comprising the processor core to request metadata associated with the memory access request from the memory, and the cache to receive the metadata and store the metadata in the cacheline.

8. The apparatus of claim 7, comprising the processor core to perform a memory safety check for accessing the decrypted data of the data granule based at least in part on the color value of the metadata and access the data decrypted using the color value when the memory safety check passes.

9. The apparatus of claim 8, comprising the processor core to replace the speculated color value with the color value of the metadata and re-decrypt the data of the data granule using the color value of the metadata when the speculated color value does not match the color value of the metadata.

10. The apparatus of claim 8, wherein the processor core is to speculatively access the data decrypted using the speculated color value faster than the processor core is to access the data decrypted using the color value.

11. The apparatus of claim 1, comprising the processor core to request the cacheline to be loaded from the memory when data to be accessed, the data being referenced by a pointer in the memory access request, is not in the cache.

12. The apparatus of claim 10, comprising the cache to determine the speculated color value based at least in part on a previous memory access request.

13. A system comprising:
a memory to store a cacheline including a data granule; and
a processor, the processor including:
a processor core to request the cacheline to be loaded from the memory in a memory access request including a color value;
a cache to determine a speculated color value for the memory access request when a color value for the data granule is not stored in the processor, receive the data granule from the memory, and decrypt data of the data granule using the speculated color value; and
circuitry to check whether the speculated color value matches the color value in the memory access request.

14. The system of claim 13, comprising the cache to propagate the decrypted data of the data granule to other levels of the cache.

15. The system of claim 13, comprising the processor core to speculatively access the decrypted data of the data granule.

16. The system of claim 15, comprising the processor core to set an access bit associated with the data granule and a hardware thread of the processor core when the processor core speculatively accesses the decrypted data of the data granule.

17. The system of claim 13, comprising the processor core to access the decrypted data when the speculated color value matches the color value in the memory access request.

18. The apparatus of claim 2, wherein the cache is to determine the speculated color value for the memory access request when a color value of metadata for a data granule of the cacheline is not stored in the cache.

19. The apparatus of claim 2, wherein the cache is to provide the decrypted data of the data granule to the processor core before it is known that the color value in the memory access request matches a color value of metadata for the data granule in the memory.

* * * * *